United States Patent
Lopez-Risueno et al.

(10) Patent No.: US 8,059,700 B2
(45) Date of Patent: Nov. 15, 2011

(54) METHOD OF PROCESSING POSITIONING SIGNALS, IN PARTICULAR FOR INDOOR APPLICATIONS

(75) Inventors: Gustavo Lopez-Risueno, Murcia (ES); Gonzalo Seco Granados, Barcelona (ES)

(73) Assignee: Agence Spatiale Europeenne, Paris Cedex (FR)

( * ) Notice: Subject to any disclaimer, the term of this patent is extended or adjusted under 35 U.S.C. 154(b) by 161 days.

(21) Appl. No.: 12/224,602

(22) PCT Filed: Mar. 3, 2006

(86) PCT No.: PCT/EP2006/002581
§ 371 (c)(1),
(2), (4) Date: Nov. 23, 2009

(87) PCT Pub. No.: WO2007/098787
PCT Pub. Date: Sep. 7, 2007

(65) Prior Publication Data
US 2010/0061427 A1     Mar. 11, 2010

(51) Int. Cl.
*H04B 1/00* (2006.01)
(52) U.S. Cl. ........ 375/150; 375/135; 375/136; 375/137; 375/152; 375/144
(58) Field of Classification Search .................. 375/150, 375/135, 136, 137, 152, 144
See application file for complete search history.

(56) References Cited

U.S. PATENT DOCUMENTS

| | | | |
|---|---|---|---|
| 4,445,118 A * | 4/1984 | Taylor et al. | ........... 342/357.395 |
| 5,225,842 A | 7/1993 | Brown et al. | |
| 5,420,592 A | 5/1995 | Johnson | |
| 5,663,734 A | 9/1997 | Krasner | |
| 6,236,354 B1 | 5/2001 | Krasner | |
| 6,646,596 B2 | 11/2003 | Syrjarinne et al. | |
| 6,707,423 B2 | 3/2004 | Turetzky et al. | |
| 6,795,771 B2 | 9/2004 | Fuchs et al. | |
| 2001/0002203 A1* | 5/2001 | Cahn et al. | ..................... 375/142 |
| 2002/0183071 A1* | 12/2002 | Shioda et al. | .................. 455/456 |

(Continued)

FOREIGN PATENT DOCUMENTS

WO    03/039021 A1    5/2003

(Continued)

OTHER PUBLICATIONS

G. Sun et al, "Signal Processing Techniques in Network-Aided Positioning; A survey of the state-of-the-art positioning designs", IEEE Signal Processing Magazine, Jul. 2005; pp. 12-23.

(Continued)

*Primary Examiner* — Kabir A Timory
(74) *Attorney, Agent, or Firm* — Clark & Brody

(57) ABSTRACT

A method of processing positioning signal constituted by a superposition of individual signals generated by a plurality of emitters, in particular satellite emitters, comprising:—a first step of coarse acquisition of said individual signals, comprising correlation of the received positioning signal with locally generated replicas of said individual signals;—a step of identifying spurious correlation peaks induced by interferences; and—a step of estimating the code delays and the carrier frequency shifts of the acquired individual signals which are not affected by said interferences. According to preferred embodiments of the invention, the method can also comprise:—a refining step of determining more accurate estimates of said code delays and carrier frequency shifts; and—a step of interference cancellation. The method of the invention is particularly suitable to indoor positioning applications.

29 Claims, 10 Drawing Sheets

U.S. PATENT DOCUMENTS

| | | |
|---|---|---|
| 2003/0165186 A1* | 9/2003 | Kohli et al. .................. 375/150 |
| 2004/0042568 A1 | 3/2004 | Rowitch |
| 2005/0032513 A1 | 2/2005 | Norman et al. |
| 2005/0099334 A1 | 5/2005 | Roh |

FOREIGN PATENT DOCUMENTS

| | | |
|---|---|---|
| WO | 2004/005954 A2 | 1/2004 |

OTHER PUBLICATIONS

O. Otaegui et al., "Real Time Fast Acquisition based on Hardware FFT for a GPS/EGNOS receiver", Proceedings of the European Navigation Conference ENC-GNSS 2005.

J. Syrjarinne et al., "Possibilities for GPS Time Recovery with GSM Network Assistance", ION GPS 2000, Sep. 19-22, 2000, Salt Lake City, UT, pp. 955-966.

K. Pahlavan et al., "Indoor Geolocation Science and Technology", IEEE Communications Magazine, Feb. 2002, pp. 112-118.

B. Peterson et al., "GPS Receiver Structures for the Urban Canyon", Proceedings of the ION GPS, 1995, pp. 1323-1332.

M. Psiaki, "Block Acquisition of Weak GPS Signals in a Software Receiver", ION GPS 2001, Sep. 11-14, 2001, Salt Lake City, UT, pp. 1-13.

W. Utlaut, "Spread Spectrum: Principles and Possible Application to Spectrum Utilization and Allocation", IEEE Communications Society Magazine, Sep. 1978, pp. 21-31.

Y. Morton et al, "Assessment and Handling of CA Code Self-Interference during Weak GPS Signal Acquisition", ION GPS/GNSS 2003, Sep. 9-12, 2003, Portland, OR, pp. 646-653.

P. Madhani et al., "Application of Successive Interference Cancellation to the GPS Pseudolite Near-Far Problem", IEEE Transactions on Aerospace and Electronic Systems, vol. 39, No. 2, Apr. 2003, pp. 481-488.

G. Lopez-Risueno et al., "CN0 Estimation and Near-Far Mitigation for GNSS Indoor Receivers", Vehicular Technology Conference, 2005. VTC 2005-Spring. 2005 IEEE 61st In Vehicular Technology Conference, pp. 2624-2628 vol. 4.

G. Lopez-Risueno et al., "Measurement and Processing of Indoor GPS Signals Using a One-Shot Software Receiver", Proceedings of ESA Navitec 2004.

G. Lopez-Risueno et al., "Evaluation of GPS Indoor Positioning using Real Measurements and a One-Shot Software Receiver", Proceedings of the European Navigation Conference ENC-GNSS 2005.

G. Lachapelle, "GNSS Indoor Location Technologies", Proceedings of the 2004 International Symposium on GPS/GNSS (GNSS 2004), Australia.

E. Glennon et al, "A Review of GPS Cross Correlation Mitigation Techniques", The 2004 International Symposium on GNSS/GPS, Sydney, Australia, Dec. 6-8, 2004.

G. Hein et al., Status of Galileo Frequency and Signal Design,Proceedings of the ION GPS 2002.

G. Lachapelle et al., "HSGPS Signal Analysis and Performance under Various Indoor Conditions", Navigation: Journal of the Institute of Navigation (ION), vol. 51, No. 1, spring 2004.

D. Lin et al., "Comparison of Acquisition Methods for Software GPS Receiver", ION GPS 2000, Sep. 19-22, 2000, Salt Lake City, UT, 2385-2390.

J. Jarvinen et al, "Assisted GPS: A Low-Infrastructure Approach", GPS World, the Business and Technology of Global Navigation and Positioning, Mar. 2002.

3rd Generation Partnership Project (3GPP), "Technical Specification Group Radio Access Network: Stage 2 functional specification of User Equipment (UE) positioning in UTRAN (Release 7)", Technical Specification TS 25.305 v7.00, 3GPP, 2005, http://www.3gpp.org, Jun. 2005.

Coordination Group on Access to Location Information for Emergency Services (CGALIES). Work Package 1, Technical report, 2002, http://www.telematica.de.cgalies, Feb. 18, 2002.

J. Tsui, "Acquisition of Weak Signals", Fundamentals of Global Positioning Receivers: A Software Approach, Second Edition, 2005, John Wiley & Sons, Inc., 224-270, 286-288.

Parkinson et al. (Editors), Global Positioning System: Theory and Applications. American Institute of Aeronautics and Astronautics, vol. 1, 1996, 390-392.

J. Spilker, Digital Communications by Satellite. Prentice-Hall, 1977, 586-597.

E. Kaplan (editor), Understanding GPS: Principles and Applications. Artech House, 1996, 3-5, 140-142, 155-175, 219-228, 302-327.

* cited by examiner

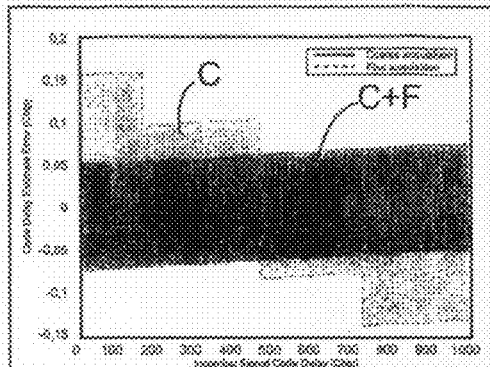
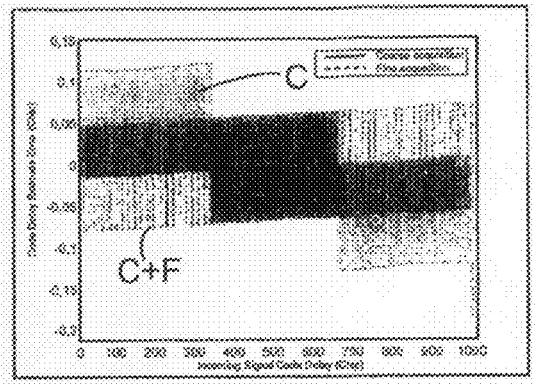
FIG.10A  FIG.10B
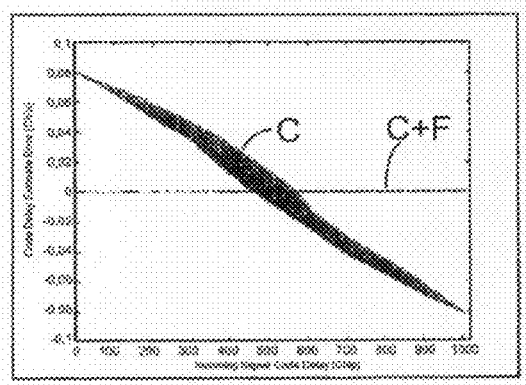
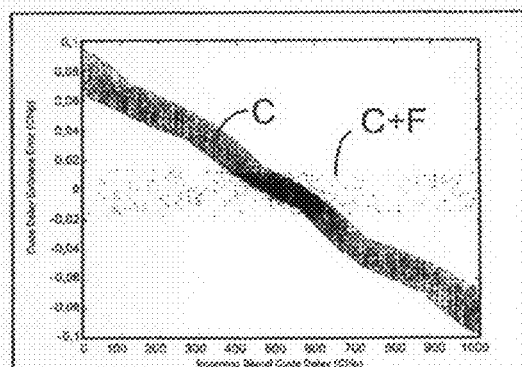
FIG.11A  FIG.11B
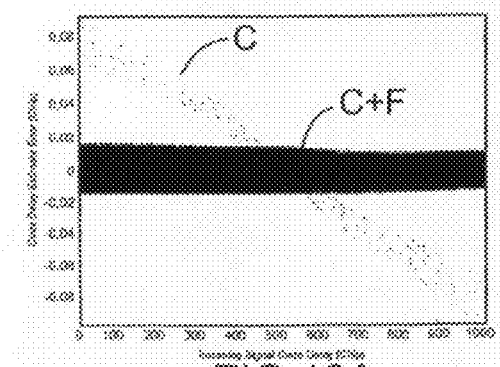
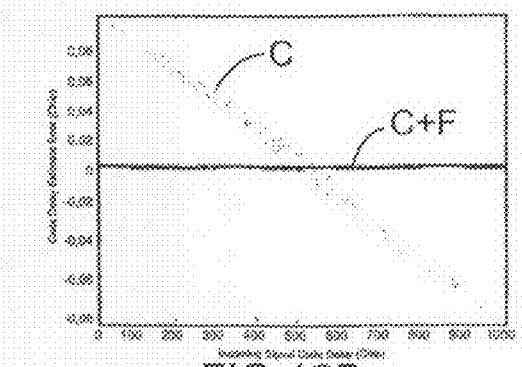
FIG.12A  FIG.12B

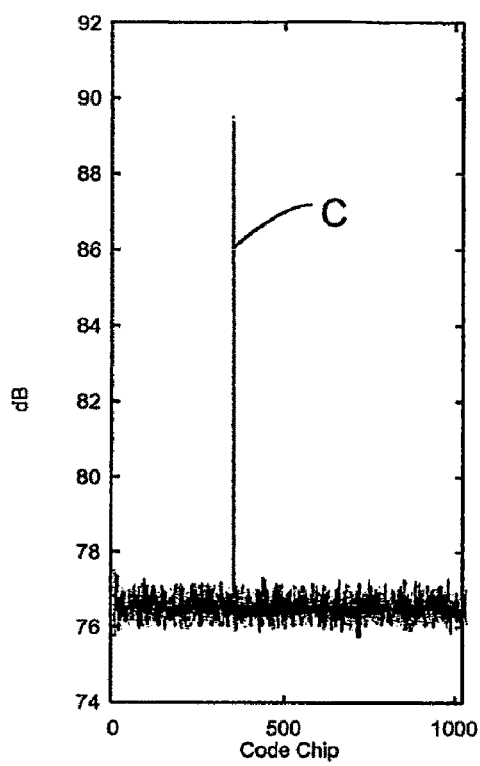
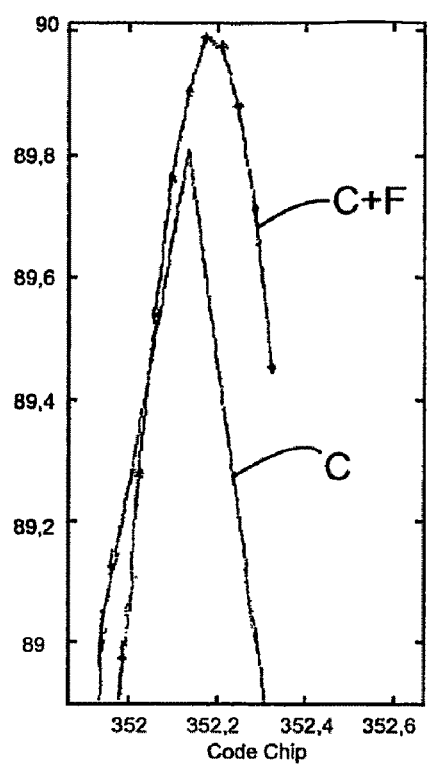
FIG.13A  FIG.13B
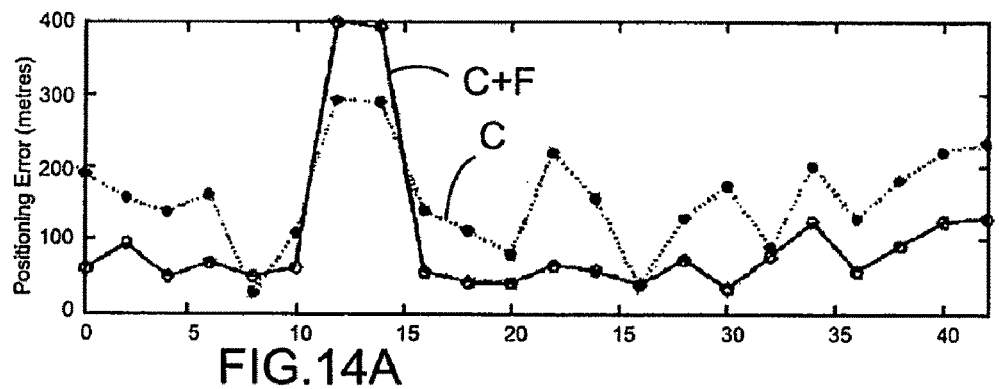
FIG.14A
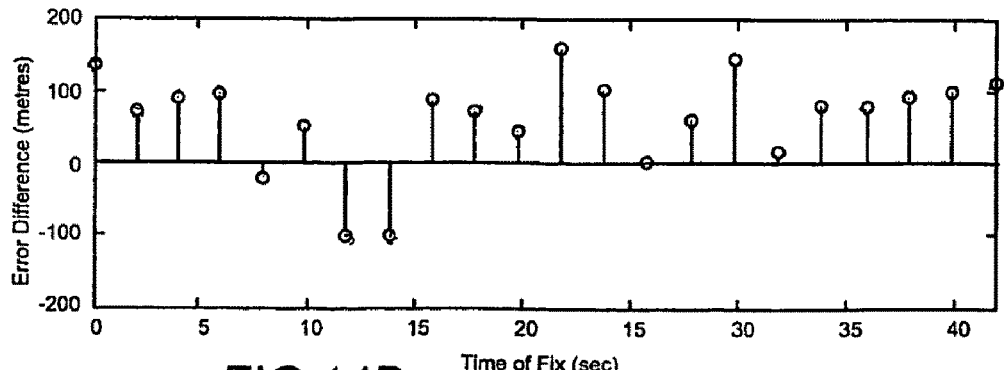
FIG.14B

METHOD OF PROCESSING POSITIONING SIGNALS, IN PARTICULAR FOR INDOOR APPLICATIONS

The invention relates to a method of processing a set of spread-spectrum positioning signals, and in particular a Global Navigation Satellite System (GNSS) signal, such as a GPS, Glonass or Galileo signal. The method of the invention is particularly suitable to urban and indoor positioning applications.

BACKGROUND OF THE INVENTION

Global Navigation Satellite Systems are systems allowing a receiver, located anywhere on or in the vicinity of the Earth, to compute its position by means of the signals broadcasted by synchronized satellite emitters. Examples of such systems are the Global Positioning System (GPS) [Kaplan, 1996], Glonass and Galileo [Hein, 2000]. A GNSS comprises a plurality of satellite emitters generating direct-sequence code-modulated signals [Utlaut, 1978], i.e. the code (taking values +1 and −1, or any other discrete set of values) multiplies the original signal. Therefore, a GNSS positioning signal is generally constituted by a superposition of individual code-modulated signals generated by a subset of said satellite emitters, each individual signal being defined by a known spreading code, by an unknown code delay and by an unknown carrier frequency shift (usually called "Doppler shift", even if it is not entirely due to Doppler effect, but also to clock and oscillator frequency offsets). Determination of the code delay is the key to positioning, but a good "Doppler" frequency shift estimation is essential in order to perform an accurate code delay estimation [Kaplan, 1996, Tsui, 2005].

In GNSS systems, the positioning of a receiving unit first requires the estimation of the time of transmission and the time of reception of the signals coming from different satellite emitters. From the time of reception and the time of transmission the so-called pseudoranges between the receiver and each transmitter are computed. Then, the position is computed by triangulation using the pseudoranges and the position of the satellite emitters.

In the conventional usage of GNSS receivers, both the time of transmission and the position of the satellite emitter are obtained by estimating the code delay, i.e. the delay between the code of the incoming signal and a receivers' local replica of the code, synchronizing that local replica to the incoming signal code, and demodulating the information (also known as navigation message) carried on the incoming signal. Therefore, the code delay estimation for each signal coming from a satellite emitter will be one of the main tasks of the receiver. The pseudoranges are corrected before triangulation in order to remove errors coming from the satellite emitter clock, the satellite emitter movement (relativistic effects), and the propagation across the ionosphere and troposphere. The corrections for the first three errors can be obtained from the navigation message. For the last one, the receiver can apply some well-known models [Kaplan, 1996]. As the time reference used in the receiver is not synchronized to the one used by the transmitter, the receiver clock error is another unknown to be estimated, besides the three position coordinates. Therefore, at least the pseudoranges to four satellite emitters are required to fix the receiver position. If the receiver unit clock error is kept equal to zero by any means and/or some of the position coordinates are known, the number of required satellite emitters will be reduced by the number of unknowns that are eliminated.

In some occasions, it is not possible to demodulate the navigation message, either due to low level of the received signal or due to time constraints in the time to first fix (note that it would be required to obtain the information in the navigation message of each satellite emitter during a time interval up to thirty seconds). In that case, an assisted approach is used: the information contained in the navigation message is provided by a Location Server, which obtains the information from an outdoor receiver unit located nearby or from other means. This approach is denoted Assisted GNSS, A-GNSS in short (Assisted GPS or A-GPS for the particular case of GPS) and can reduce the time to first fix down to several seconds and can help reduce the minimum power required in the received signal. In the expected conditions of use of Assisted-GNSS, the navigation message is not generally retrieved and, hence, the receiver does not have available the "marks" on the signal indicating the time of transmission (such as, e.g., the time-of-the-week, TOW). The differences between times of transmission of the signals of the received satellite emitters can be determined directly from the measurements, but not the absolute value since there exist a constant but unknown term affecting all of them. This difficulty can be addressed in two ways:

Making measurements to at least five satellite emitters (instead of four, like in the conventional operation) and estimating that term in the process of fixing the receiver position [Peterson, 1995, Syrjarinne, 2000].

Synchronizing the receiver to the GNSS time reference with high accuracy. This allows the receiving unit to measure the transmission times without having access to the marks on the signals. As in the conventional operation, the minimum number of received satellite emitters is four. The tight synchronization can be attained by external means, such as the communications link between the Location Server and the receiver [3GPP, 2005].

As suggested in the former paragraphs the position computation can take place in the receiver. This approach is normally named "receiver-based location calculation". Nevertheless, for the sake of complexity and cost saving in the receiver, this computation could be performed in an external unit to which the receiver sends the signals' times of reception and pseudoranges, and other pertinent information via a data link. This approach is normally named "receiver-assisted location calculation" and was exploited by the U.S. Pat. No. 5,225,842 issued to Brown et al. The computation of the position could be done either in a conventional or in an assisted way depending on the data provided by the receiver and, eventually, by the Location Server.

Conventional GNSS signal processing and positioning algorithms fail when the receiver is located in highly-dense urban areas, such as urban canyons, or inside buildings. In both types of environments, GNSS signals are subject to high attenuation and blockage (due to propagation through buildings and so-called "urban canyons"), the so-called "near-far problem" (since signals coming from different satellite emitters experiment very different attenuation), and severe multipath due to signal reflection and diffraction [Lachapelle, 2004b]. Since the propagation in both types of environments, namely urban canyons and inside buildings, suffers from the same problems, they are hereafter jointly referred to as indoor environments.

Attenuation due to propagation in "indoor" environments can be more than 30 dB. Thus signals transmitted by the transmitting units on board the satellite emitters will reach an indoors receiver with a very weak level of power, given that GNSS are nominally designed for outdoors operation. This means that a high-sensitivity receiver is required to detect the signals; otherwise there will be no means to estimate their pseudoranges.

The fact that signals from different satellite emitters can experiment different attenuation as they follow different propagation paths gives rise to the so-called near-far problem: if two signals, coming from different transmitters, reach the receiver with a big difference in power, the code delay estimation of the weakest signal will present important errors due to the interference of the strongest one. This effect is called "near-far" in reference to the differences in received signal power experienced in cellular communication systems. In these systems, the power differences are due to the differences in distance from the mobile to the base stations; however, in GNSS the power differences are caused by the different attenuation of the propagation paths, and not by the differences in distance from the receiving unit to the satellites, which are relatively small. Near-far problem will not only affect the code delay estimate, but also the estimation of other parameters of the weakest signals, such as the frequency and the data (in case that it is possible to estimate the data). The error in the code delay can be very important and gives rise to high positioning errors. In an extreme case, the weakest signal could not even be detected by the receiving unit. In direct sequence modulated systems, the difference in power between received signals that is tolerated by the receiver without suffering from the near-far problem depends on the cross-correlation of the codes modulating the signals. In GNSS-based positioning, the near-far problem does not appear outdoors (i.e. open field), since all the signals arrive at the receiver with nearly the same power.

Multipath refers to the fact that the receiver can receive several signals coming from the same transmitter that have propagated along different paths. This problem also happens outdoors, where there is a line-of-sight signal (also called direct-ray signal), which is the one to be used in the pseudorange estimation, and other delayed replicas of the signal with smaller amplitude that are originated by reflection and/or diffraction on obstacles around the receiver. The delayed replicas cause an additional error in the code delay estimation of the desired signal, which is the line-of-sight signal, if it exists, or otherwise the signal with the shortest propagation path. This error is ultimately due to the fact that the receiver cannot distinguish the desired signal from the rest when their relative delays are small compared to the inverse of the signal bandwidth. The multipath effect is much more significant indoors, since the building structure and the number of objects surrounding the receiver facilitates the appearance of reflections and diffractions.

Given the above-referred problems, conventional GNSS receivers, designed for outdoor applications, are not able to work properly indoors since they fail in accurately estimating the code delay of the signal generated by the individual satellite emitters. Lack of an accurate estimation of the code delay forbids accurate positioning of the receiver unit.

Some of the difficulties associated with indoor positioning are well known, and several solutions have been proposed in the past, none of which gives complete satisfaction.

Many outdoor GNSS receivers are based on the so-called "acquisition and tracking" architecture, comprising two stages. In the first "acquisition" stage a coarse estimation of both code delay and carrier frequency shift is computed. These estimations are refined in the "tracking" stage. This technique will be described in detail with reference to FIGS. 1A, 1B and 2.

The former architecture has been the baseline for several patents dealing with positioning using weak code modulated signals, such as the U.S. Pat. No. 6,707,423 issued to Turetzky et al, and the U.S. Pat. No. 6,795,771 issued to Fuchs et al. The adaptation of this structure to weak signals has been also treated in the literature [Lachapelle, 2004a, Lopez-Risueno, 2004, Psiaki, 2001], often under the name of High Sensitivity GPS or High Sensitivity GNSS receiver. Mainly, the processing of weak signals requires the use of both long coherent correlation times and large noncoherent integration during acquisition (see FIG. 1A), and the use of narrowband loops during tracking. For instance, for GPS L1 C/A signals, coherent correlation could be on the order of 10 ms per block or greater, and the noncoherent integration could extend beyond 100 blocks, so that the overall dwell time would be on the order of seconds.

The large dwell time required for low acquisition threshold leads to complex acquisition stages and large acquisition times. Thus, assisted information coming form a Location Server nearby is used in references above, i.e. they work in Assisted-GNSS mode rather than in standalone mode. The required assisted information is at least the list of visible transmitters in the area, i.e. the in-view satellite emitters, and their approximate Doppler frequencies. This way, the acquisition narrows the delay-Doppler search and can be accomplished in an affordable way: They perform acquisition based on the FFT (see FIG. 1B) but searching a few Doppler frequencies only. Nevertheless, the main problem of those approaches is the use of tracking, since it makes the receiver work continuously. This is a major problem concerning power consumption because these kinds of receivers are intended to be mounted on a mobile platform, like a mobile phone.

The use of receivers with only acquisition allows working with snapshots of the signal instead of digitalizing samples continuously. However, it raises the problem of the poor estimation of the code delay in the acquisition stage. In several embodiments, the U.S. Pat. No. 5,663,734, issued to Krasner, describes receiving units working with signal snapshots and comprising only acquisition via the FFT (see FIG. 1B). To improve the code delay estimation a further interpolation using the correlation samples around the correlation peak is performed. The embodiments of that patent also work in Assisted-GNSS mode to facilitate the acquisition. The drawback of those embodiments is that they work properly only when i) the code period is a multiple of the sampling period and ii) for moderately-long dwell times, i.e. on the order of 1 second or less. If i) is not complied, the FFT-based acquisition leads to an error in the code delay estimation, despite the use of interpolation. Due to technical constraints, it is not always possible to select a sampling frequency fulfilling the former condition. Regarding long dwell times, i.e. larger than 1 second, even small differences between the trial Doppler frequencies and the real one can lead to a degradation in the correlation computation due to the Doppler effect in the code and, subsequently, to an error in the code delay estimation. Long dwell times of several seconds will be required for indoor environments.

On the other hand, the U.S. Pat. No. 6,795,771, issued to Fuchs et al, includes one embodiment with only acquisition, which uses the FFT-based acquisition, selects a peak and performs conventional correlations for several delays around the peak. However, in order to obtain an integer number of samples per code period, re-sampling of the incoming signal is performed at the expense of increasing the receiver complexity. Nevertheless, the problem of long dwell times is neither dealt with nor solved.

Regarding the near-far problem, also known as cross-correlation mitigation, several methods to detect it have been proposed in previous patents (U.S. Pat. No. 6,236,354 issued to Krasner, U.S. Pat. No. 6,795,771 issued to Fuchs et al, U.S. Pat. No. 6,646,596 issued to Syrjarinne et al, U.S. Pat. No. 6,707,423 issued to Tureztky et al), patent applications (US Patent Application No. 20050099334 issued to Roh) and literature [Glennon, 2004]. First, they try to detect whether or not the correlation between an incoming signal and its replica is affected by the interference of a stronger signal coming from a different transmitting unit mainly by looking for the strongest satellite emitter signals and computing the difference in power between strong and weak signals. If the interference of a stronger signal is detected, while some techniques simply do not consider the weaker signal for positioning purposes, others try to mitigate the cross-correlation by looking for the right correlation peak among all the peaks coming from the afore-mentioned interference. Further, the U.S. Pat. No. 6,236,354 issued to Krasner tries to remove the interference either by estimating and removing the strongest signal before correlation, or by, less-effectively, estimating and removing its contribution to the cross-correlation after correlation. The removal of the strongest signal is also known in the literature as successive interference cancellation [Madhani, 2003].

In order to understand the limitations of the previous methods, it is worth noting that once a satellite emitter signal has been acquired, if the delay was correctly estimated (i.e. it was not erroneous due to near-far problem), the receiver clock frequency error can be determined, and hence the Doppler search for the rest of the remaining satellite emitters can be reduced. Furthermore, a rough estimate of the difference in delay of the remaining satellite emitters can be provided by the Location Server. This difference in delay refers to the difference between the delay of the acquired satellite emitter and the delay of the remaining satellite emitters. In so doing, the acquisition of the remaining satellite emitters could be further simplified, and only the exploration of a few delay-Doppler pairs would be necessary.

A main problem with the previous methods is that they require that either all the satellite emitters or at least the strong ones (the ones received with higher power level, which are likely to produce interferences) have been acquired before running the near-far problem detection and/or mitigation algorithm. This increases the processing time. Further, a reduced delay-Doppler space after the first satellite emitter acquisition cannot be performed since it is not assured that this first satellite emitter is unaffected by the near-far problem.

SUMMARY OF THE INVENTION

An object of the present invention is to provide a method of processing a snapshot of a positioning signal allowing an efficient and accurate estimation of the code delay of code-modulated signals even in indoor environments, overcoming at the same time at least part of drawbacks and limitations of the prior art.

This object is achieved by the method of the invention, offering the following advantages:
 the sampling frequency is not restricted to particular values;
 re-sampling of the incoming signal is not needed;
 it is not necessary to acquire all "strong" satellite emitters before any weak satellite can be acquired: the near-far problem detector does not have to wait for the acquisition of all satellite emitters; and "near-far problem" detection is performed through a very simple statistical test, without the need for a peak-by-peak analysis of the weak satellite emitters' correlations.

In particular, a preferred embodiment comprises a near-far problem mitigation step which is not applied on all satellite emitters, but only on those that have been classified as near-far interfered by the near-far problem detector, thus considerably reducing the computational complexity.

For the sake of simplicity, in the following description it is assumed that each transmitter uses its own periodic code and that all the codes have the same period (also referred to as "code epoch"), however the invention is also applicable if several transmitters use the same code (as in Glonass). The invention is also applicable if the signal is modulated by a secondary code (as in Galileo) and/or by an information-bearing sequence of symbols. The only condition is that the duration of each element of the secondary code (only if it is present) and the duration of symbol (only if the information-bearing signal is present) is an integer multiple (including the case of equality) of the code epoch. Note that, in this context, this is a very mild condition since all existing GNSS signals fulfill this condition.

BRIEF DESCRIPTION OF THE DRAWINGS

Additional features and advantages of the present invention will become apparent from the subsequent description, taken in conjunction with the accompanying drawings, which show:

FIGS. 10A to 12B, plots of the Code Delay Estimation Error as a function of Code Delay for different estimation techniques according to the invention and to the prior art;

FIGS. 13A and 13B, a correlation trace for an individual signal showing the improvement in delay estimation obtained through the "fine acquisition" step of the method of the invention;

FIGS. 14A and 14B, two plots of the positioning error showing the improvement in positioning accuracy obtained through said "fine acquisition" step;

DETAILED DESCRIPTION OF THE INVENTION

As it has already been discussed, a GNSS receiver processes a received positioning signal in order to estimate two parameters for each satellite emitter: its "Doppler" carrier frequency shift and its code delay.

In prior art receivers, estimation of both parameters is usually done simultaneously and comprises two stages: acquisition and tracking. In acquisition, a coarse estimate of both the code delay and Doppler frequency is computed. These coarse estimates are refined along the tracking stage.

Figure 1A:
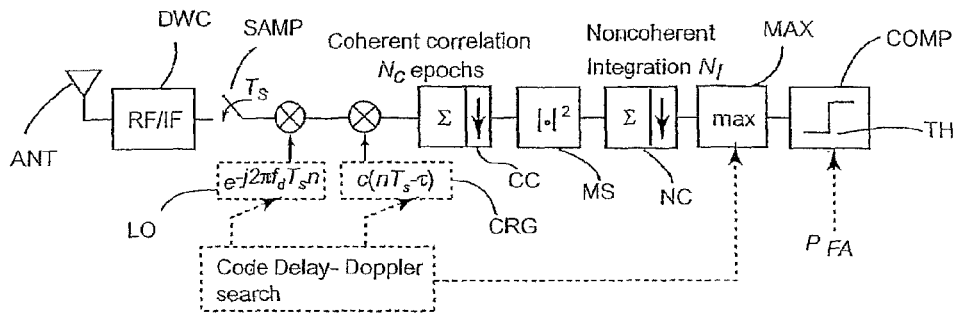
FIGS. 1A and 1B, block diagrams of acquisition stages of prior art GNSS receivers.

FIG. 1A shows a typical acquisition stage, comprising in particular an antenna ANT, front-end electronics DWC to downconvert the signal from RF (radiofrequency) to IF (intermediate frequency), a sampling and analog-to-digital converting device SAMP, digitalizing the signal at sampling rate $f_s$ (or sampling period $T_s=1/f_s$), and with a number of bits b per sample. In acquisition, the receiving unit searches for the code delay and the Doppler frequency maximizing the correlation between a received signal coming from a certain transmitting unit and the corresponding code replica generated in the receiver. The correlation is performed in the following way: the received signal is demodulated by the trial Doppler frequency $f_d$, generated by a local oscillator LO; then it is multiplied by a replica of the code of the transmitter, generated by a code replica generator CRG, with a trial code delay $\tau$. This product is summed for $N_c$ code epochs or periods in a "coherent correlation" block CC and squared. A code period consists of $N_{chip}$ chips taking value +1 or −1. Each chip lasts $T_c$ seconds, so that a code period is $N_{chip}T_c$ seconds. For instance, for a GPS L1 C/A signal, $N_{chip}=1023$ chips and the code period is 1 millisecond (if zero Doppler). Eventually, an additional summation of $N_I$ blocks, each resulting from processing $N_c$ code periods, is performed in a "noncoherent correlation" block NC. The correlation of $N_c$ code periods is also denoted coherent correlation, whereas the squared summation of $N_I$ blocks is termed noncoherent integration, noncoherent accumulation or noncoherent correlation. The result of the noncoherent integrations obtained for all the pairs delay-Doppler ($\tau$, $f_d$) is checked, and the maximum value is chosen ("MAX" block). This value is compared with a threshold TH in a comparator block COMP in order to determine whether the correlation peak is possibly representative of an individual signal, generated by the satellite emitter identified by the code used for correlation or it just comes from a noise peak. The threshold is chosen according to a given requirement of probability of false alarm ($P_{FA}$) and considering that in the absence of correct Doppler and delay estimates the result of the integrations has a chi-square distribution with $2N_I$ degrees of freedom. The acquisition search is performed on a discrete grid of delay and Doppler points, the resolution in Doppler usually being inversely proportional to the duration of $N_c$ code periods and the resolution in delay ranging from 1 sample to several ones, usually up to half of the chip period.

The sensitivity of the receiving unit increases, and hence weaker signals can be acquired, with $N_c$ and $N_I$. Further, it is more efficient in terms of sensitivity to increase $N_c$ rather than $N_I$, although there are limitations in the extension of $N_c$ given by the receiver clock and dynamics, the navigation message symbol rate of the GNSS signal, and complexity. A higher $N_c$ means that a more-stable receiver clock, slower receiver dynamics and a more complex acquisition process are required. Additionally, $N_c$ cannot be greater than the duration of the navigation message symbol if the navigation message is not a priori known. Typically for GNSS signals, there are an integer number of code periods, denoted $N_{symb}$, per navigation message symbol. For instance, $N_{symb}=20$ for GPS L1 C/A signals.

Nevertheless, the value of $N_I$ cannot be increased arbitrarily either since larger values of $N_I$ imply longer times to fix. Moreover, as it will be discussed further, the required accuracy for the frequency estimation also increases with $N_I$, and therefore $N_I$ is also limited by the receiving unit clock stability and dynamics. For conventional receiving units, the values of $N_c$ and $N_I$ are quite low: for example, for conventional GPS L1 C/A receivers, $N_c$ ranges from 1 to 3 code periods and $N_I$ is usually 1 block. Receiving units with that configuration are not intended for weak signals like the ones encountered in indoor, but for the typical signals levels achieved in open field locations. This level is around −150 dBW for GPS and Galileo according to specifications.

Figure 1B:
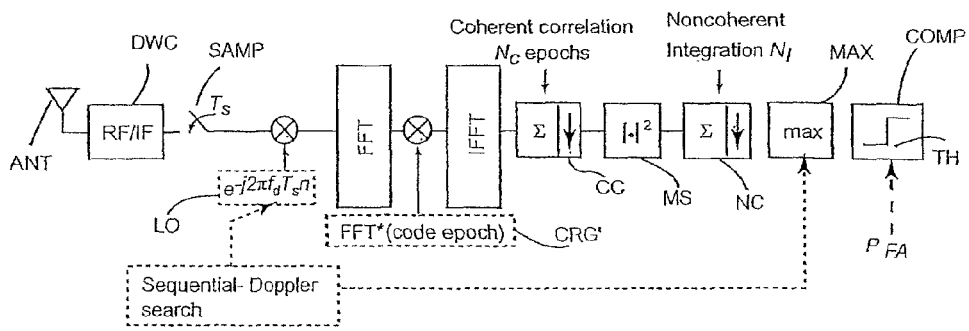

The scheme in FIG. 1A may be subject to many variations, since the delay-Doppler can be done following a wide range of techniques. For instance, each pair delay-Doppler can be evaluated in a serial way [Kaplan, 1996] or in parallel (see [Lin, 2005] for a survey on parallel approaches). Specially interesting for the invention described herein is the parallel approach based on the FFT (Fast Fourier Transform), in which the code delay is searched in parallel by performing the inverse FFT of the product of the FFT of the signal and the complex conjugate of the FFT of the code replica, as depicted in FIG. 1B. Due to the properties of the FFT, it turns out to be a very efficient approach to performing the search in the code delay. This method has been used in the U.S. Pat. No. 5,420,592 issued to Johnson, and in other embodiments processing weak signals, such as in the U.S. Pat. No. 5,663,734, issued to Krasner, and in the U.S. Pat. No. 6,795,771, issued to Fuchs et al.

After acquisition, the tracking stage refines both the code delay and Doppler estimates following a feedback approach. For the code delay there is a delay lock loop (DLL), which basically consists of a code delay discriminator, a loop filter and a numerically controlled oscillator (NCO). The code delay discriminator uses different correlations obtained for code replicas with delays that are offset with respect to the delay estimate. The discriminator provides a signal approximately proportional to the difference (or error) between the incoming signal delay and the delay estimate. For instance in FIG. 2, two replicas delayed +δ (late correlator) and −δ (early correlator) with respect to the estimated delay are used in the discriminator along with the replica with the estimated delay (prompt correlator). Depending on the discriminator, only the early and the late correlator, or several early and several late correlators might be used [Kaplan, 1996]. The delay error estimated by the discriminator is filtered by the loop filter and goes to a numerically controlled oscillator (NCO), which drives the code generator producing the new code replicas with a re-estimated code delay. Then, new correlations are computed and the operation of the loop carries on. For the carrier phase, it is done in a similar way by the use of a phase lock loop (PLL). That is, the difference between the phase of the incoming signal and a locally generated carrier is estimated. In order to achieve this, the discriminator of the PLL needs to take the coherent correlation from the prompt correlator instead of the non-coherent one. Next, that phase difference passes through a loop filter whose output controls another NCO. In both cases, the loop bandwidth, which is determined by the loop filter to a great extent, must be selected as a result of a trade-off between noise response and dynamic behavior of the loop.

What has been described so far constitutes one channel out of the receiver, which typically has more channels, each correlating the received and digitized signal with a different code in order to acquire signals coming from several emitters at the same time.

As already discussed, use of the conventional "acquisition-tracking" architecture in indoor environments is possible, but not completely satisfactory, since a very long correlation time is required, which implies complex receiving stages and a high sensitivity of the code delay estimate to small errors in the Doppler estimates, and moreover continuous tracking is usually not needed in many indoor applications. Moreover, "near-far problem" detection and possibly mitigation can be performed only after acquisition of all the emitters, or at least a significant number of them, and this further increases the complexity of the receiver and slows down the processing.

Figure 3:
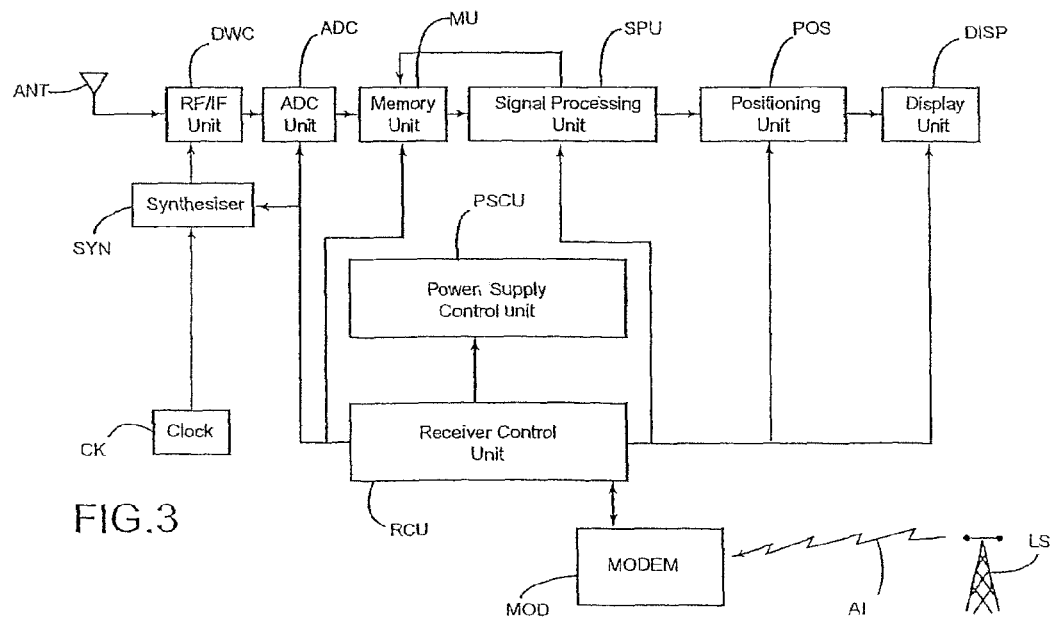
FIG. 3, a block diagram of a receiving unit according to the invention.

An embodiment of a receiving unit according to the invention is shown in FIG. 3. The signals transmitted by the transmitters are received by means of an antenna ANT followed by a RF front-end or RF/IF unit or downconverter DWC that amplifies, filters and eventually down-converts the received signals to intermediate frequency. The RF/IF unit DWC formats the incoming signal so that it can be digitalized by the analog-to-digital conversion unit ADC and then stored in samples in the Memory unit MU. This Memory unit MU can be a single storage module such as a random-access memory, a shift-register, or just be the internal memory of a more complex module, such as a processor or a field programmable gate array. The stored snapshot samples are processed by the Signal Processing Unit SPU, whose mainly objective is the estimation of the code delay of the incoming signals with respect to a code replica generated in the receiver. In certain configurations of the Signal Processing Unit, the signal samples can undergo a number of operations and be saved again in the Memory unit for further processing.

Using the code delay estimates given by the Signal Processing Unit, the Positioning Unit PU computes the position, which can be shown in a Display Unit DU, send to another device, stored, etc. depending on the application. The Positioning Unit implements an Assisted-GNSS procedure to compute the position, such as the ones described in [Syrjarinne, 2003, Peterson, 1995]. Preferably, Assistance Information AI, sent by a nearby Location Server LS through a communications system, is received by a suitable Modem MOD. The Signal Processing and Positioning Units can be implemented in separate hardware modules or jointly. Those modules can comprise one or several processing devices, such as general-purpose microprocessors, digital signal processors, programmable logic devices, ASICs, etc.

There is a Clock unit CK and a Synthesizer SYN that generates all the frequencies required, e.g. all clock signals of the rest of units, the local oscillators in the RF/IF units, and the sampling frequency of the ADC. The connections of the Synthesizer are not plotted in their entirety for the sake of clarity. The Clock unit can be specific for the described apparatus or shared with other systems working on the same platform as the described apparatus. For instance, it can be included in a mobile device like a mobile phone or PDA. The same comment applies to the Synthesizer.

The Receiver Control Unit RCU manages the data flow and the configuration of the described units, some of which can be reconfigurable, such as the RF/IF unit, the Synthesizer and the Signal Processing Unit. It also controls the Modem, which is utilized to receive the assistance data and eventually to transmit position-related data to any external centre. Moreover, the described apparatus can share the modem with other systems on the same platform, such as mobile phones or PDAs. Additionally, the Receiver Control unit can have other types of interface with other systems on the same platform and with the user, such as data buses or push-buttons.

The management of the power supply is performed by the Receiver Control unit via the Power Supply Control Unit PSCU, which is in charge of putting some units or parts of them in an active mode or in a sleep mode when they are not in use. This allows a saving in energy, which is very important if the described apparatus is mounted on a mobile platform with battery supply. Its connections with the rest of units are not plotted in FIG. 3 for the sake of clarity.

The processing method of the invention is performed by the Signal Processing Unit SPU with the help of the Memory Unity MU. This method will be now disclosed by the description of three exemplary and non-limitative embodiments.

Figure 4:
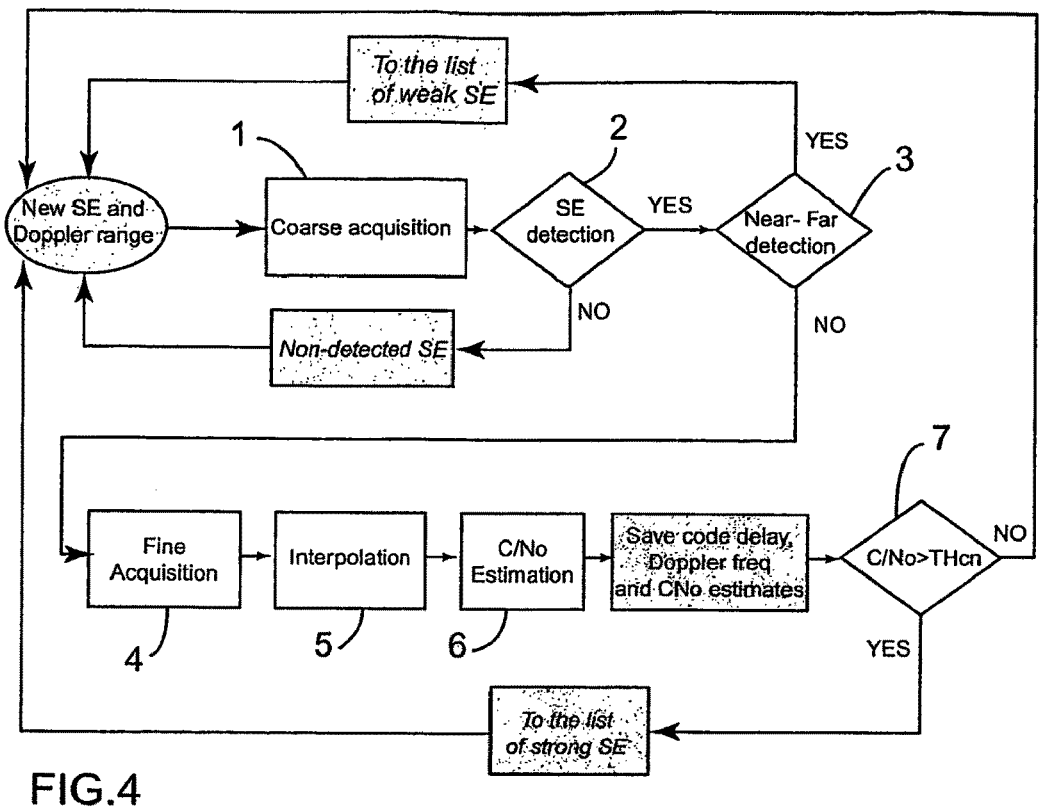
FIG. 4, a flow-chart of a first embodiment of a processing method according to the invention.

A first embodiment of this processing method is schematically represented by the flow-chart of FIG. 4. In this embodiment, the Signal Processing Units stores a list of all the satellite emitters in view from the present location, the identification of their modulating codes and their approximate carrier frequency shift (subsequently referred to as "Doppler frequency" even if, as already pointed out, it is not only due to Doppler effect). This information is obtained from the assistance data and passed to the Signal Processing unit through the Receiver Control unit. Assistance data are extremely helpful in simplifying the subsequent signal processing, as only the modulating codes of in-view satellite emitters and frequency shifts in a limited range around the approximate Doppler frequencies need to be searched for. However, the method of the invention can also apply to autonomous positioning (without assistance data): in this case, the "list of in-view satellite emitters" comprises all the emitters belonging to the system, which increases the processing time.

Like in prior art "snapshot" receivers, the method of the invention comprises the preliminary steps of receiving and down-converting the positioning signal over a predetermined time span, sampling the received positioning signal at a predetermined sampling frequency ($T_s$) and converting it to digital form. These prior art operations are not represented on FIG. 4 for the sake of simplicity.

After the "snapshot" of the positioning signal has been digitized and stored in the Memory Unit MU, the Signal Processing Unit SPU picks up a modulating code and a Doppler range from the list of in-view satellite emitters (SE for short in the figures): this is represented by the "New SE and Doppler range" block in FIG. 4. The following processing steps are then performed (numbers correspond to references on FIG. 4):

1. Coarse satellite emitter acquisition, by correlating the received signal with the picked-up code for different trial carrier frequency shifts belonging to the picked-up "Doppler" range; all possible code delays, with a granularity equal to one sample, can be evaluated simultaneously if the correlation is performed using the FFT.

2. Satellite emitter detection, consisting in identifying a correlation peak for each frequency shift—modulating code pair and determining whether said peak is possibly representative of an individual signal generated by the satellite emitter associated to the picked-up code and Doppler range, of it is only a spurious peak due to noise;

3. "Near-far problem" detection, consisting in determining whether a "significant" (i.e. not simply generated by noise) correlation peak is likely to be strongly affected by interferences from other satellite emitters, in which case it is discarded and the corresponding emitter is added to a list of "weak" satellite emitters;

4. and 5. Further processing of correlation peaks which have been determined to be interference-free by "fine acquisition" (step four) and "interpolation" (step five) in order to refine the coarse code delay estimate obtained after steps one and two;

6. and 7. Estimation of the carrier-to-noise spectral density ratio (C/No) for the signals which have not been discarded at step three; if C/No is greater than a predetermined threshold, the corresponding emitter is added to a list of "strong" emitters which are likely to cause interferences. This carrier-to-noise spectral density ratio estimation is useful as an indicator of the received signal quality, and its importance also relies on the fact that it allows a subsequent eighth step of "near far problem" mitigation (not represented on FIG. 4) wherein signal coming from "weak" satellite emitters are processed in order to remove interferences and be able to use them for positioning.

Steps one to seven are repeated for all the satellite emitters of the list. After that, if necessary, the "near-far problem" mitigation step is applied to signals coming from "weak" emitters, and then these signals are again processed through steps two to seven.

At the end of the method, a number of code delays and frequency shift estimates are obtained which can be passed to the Positioning Unit POS and used for positioning purposes. These estimates are "reliable" in the sense that the individual signals to which they relate have been checked to be substantially interference-free (step three) or have been processed in order to filter out the interferences (step eight). Moreover, such estimates are rendered sufficiently accurate to allows precise positioning by the "fine acquisition" and "interpolation" steps, without the need for the time and energy consuming "tracking" step of prior art receivers.

In the following paragraphs, the different steps of the first embodiment of the invention will be described in greater detail.

The aim of coarse acquisition (step 1 in FIG. 4) is to find a first, comparatively rough estimate of both the code delay and Doppler frequency of the signal coming from a satellite emitter. This is done by computing the peak of the correlation (or, more precisely, of its squared module) between the incoming signal and a code replica generated in the receiver. Let t be the time of start of a certain snapshot collected by the receiver, for a certain code delay $\tau$ and Doppler frequency f, the squared correlation is formally defined as:

$$X_i(\tau, t, f) = \frac{1}{N_I} \sum_{r=0}^{N_I-1} \left| \sum_{n=rN_cL_c}^{(r+1)N_cL_c-1} x(t+nT_s) c_i(nT_s - \tau) \exp(-j2\pi f nT_s) \right|^2 \quad \text{(Equation 1)}$$

where index i refers to the satellite emitter under analysis, $N_I$ and $N_c$ are the number of blocks of non-coherent integration and the number of code periods of coherent correlation, respectively (see FIG. 1). $T_s$ is the sampling period, i.e. the inverse of the sampling frequency $f_s$. Signal $x(t+nT_s)$ is the sampled version of the continuous-time incoming signal recorded in the snapshot. Signal $c_i(nT_s-\tau)$ is the sampled code replica delayed by $\tau$. Note that the code $c_i(t)$ is a periodic signal, with period denoted as CodePeriod. $L_c$ is number of samples per code period. Thus a snapshot will contain $N_I \cdot N_c \cdot L_c$ signal samples. The time $N_I \cdot N_c \cdot \text{CodePeriod}$ is the snapshot duration, also called dwell time. The aim of this stage is thus to find the code delay $\tau$ and Doppler frequency f maximizing Equation 1, i.e. to find the so-called "correlation peak".

For the sake of simplicity and without any loss of generality, the time of start of the snapshot under study (time t) will be hereafter assumed to be zero, and the squared correlation $X_i(\tau, t, f)$ will be simply referred to as $X_i(\tau, f)$.

The squared correlation defined in Equation 1 can suffer from the symbol transitions in the navigation message since no data wipe-off is considered [Syrjarinne, 2000]. Note that a very good synchronization of the receiver should be required for feasible data wipe-off. Nevertheless for $N_c$ significantly smaller than $N_{symb}$, the degradation due to symbol transition is just a 1 or 2-dB loss in the correlation peak magnitude [Lopez-Risueno, 2004]: E.g. for $N_c$=10 in GPS L1 C/A receivers ($N_{symb}$—number of modulating codes chip for navigation message bit=20). Otherwise, the symbol transitions have to be detected [Psiaki, 2001, Spilker, 1977]. On the other hand, for $N_c$=$N_{symb}$=1, the correlation peak of Equation 1, if conveniently computed, is not affected at all by the symbol transitions.

In Equation 1, the values $\tau$ and f are not computed in a continuous range, but constitute a discrete set or grid, each point of the grid referred to as cell (delay cell, Doppler cell). In this first embodiment, the values of the trial code delay $\tau$ span an interval equal to the CodePeriod, while the values of the trial Doppler frequency f span the Doppler uncertainty region introduced previously. The values of $X_i(\tau, f)$ for the set of trial values of $\tau$ and f can be arranged in a matrix, denoted as $X_i(\bar{\tau},\bar{f})$. The rows (columns) of this matrix correspond to different values of $\tau$ (or t) for a fix value of f (or $\tau$).

The Fast Fourier Transform (FFT) can be used to compute efficiently each column of $X_i(\bar{\tau},\bar{f})$. Although it is known from the prior art, the FFT-based acquisition step is summarized for completeness:

i. For each frequency f of the Doppler range for the i-th satellite emitter, demodulate the signal $x(nT_s)$ by multiplying it by $e^{-j2\pi f n T_s}$ ii. for each value of l from 0 to $N_I-1$:
   ii-1. for each value of m from 0 to $N_c-1$:
      ii-1-a. Take the following $L_c$ samples of the demodulated signal (the first $L_c$ samples in the case of the first iteration) and compute its FFT;
      ii-1-b Compute the FFT of the "code replica" sequence: $\{c_i[(l \cdot N_c+m)L_c \cdot T'_s], c_i[((l \cdot N_c+m)L_c+1) \cdot T'_s], \ldots , c_i[((l \cdot N_c+m)L_c+L_c-1) \cdot T'_s]\}$, wherein $T'_s$ is an effective sampling period due to the Doppler effect on the code, which is related to the actual sampling period $T_s$ by $T'_s$=$(1+f/f_{carrier}) T_s$, $f_{carrier}$ being the carrier frequency;
      ii-1-c multiply the signal FFT by the complex conjugate of the code replica FFT, obtained in the previous step;
      ii-1-d if m=0, then store the product sequence in a first memory area, otherwise sum it to the content of said first memory area;
   ii-2 perform the IFFT of the content of said first memory area
   ii-3 square the sequence resulting from the preceding step and: if l=0, then store the result in a second memory area, otherwise sum it to the content of said second memory area;

iii Copy the content of said second memory area into the column ("frequency cell" or "Doppler cell") of matrix $X_i(\bar{\tau},\bar{f})$ corresponding to frequency f.

The frequency resolution of the coarse acquisition step, i.e. the difference $\Delta f_{coarse}$ between two consecutive frequencies of the Doppler range for a generic satellite emitter, depends on the application. Usually, it is smaller than 1/(Nc·CodePeriod), and typically $\Delta f_{coarse}$=0.66/(Nc·CodePeriod).

Similar approaches can be found in [Lin, 2000]. A more computationally efficient, but less-processing-gain way for demodulation consists of doing the signal demodulation in the frequency domain on the FFT of each block of signal (by shifting the samples from the FFT) and multiplying the FFT of the code replica sequence by a complex exponential to compensate for the Doppler in the code. That is, the Doppler in the code is viewed as a delay in time.

Another efficient, but less accurate approach consists in accumulating the $N_c$ blocks of $L_c$ samples per block for each iteration of step ii). The result of this accumulation is a block of $L_c$ samples, and therefore steps from ii-1-a)-ii-1-d) are done once in each step ii). At each iteration, the FFT of the code replica sequence used in step ii-1-b) is the same as used in the previous iteration but multiplied by a complex exponential vector in order to compensate for the Doppler effect on the code. This approach is used in U.S. Pat. No. 5,663,734, issued to Krasner and U.S. Pat. No. 6,795,771 issued to Fuchs et al.

The second step of the processing method of the invention, also known from prior art, is satellite emitter detection (step 2 in FIG. 4).

For each column $X_i(\bar{\tau}, f)$ of matrix $X_i(\bar{\tau}, \bar{f})$ (i.e. for each Doppler cell) the maximum of the squared correlation for all possible code delays $\tau$ and the given Doppler cell f is found and compared to a threshold proportional to an estimate of the noise plus the multiple access interference power. This constitutes a way of looking for significant correlation peaks, i.e. peaks which are likely to be representative of an individual emitter using the i-th modulating code, and not simply artifacts induced by noise. The noise power estimate can be taken from the power estimate of the sampled signal x(nTs) or from the average of the values of the column $X_i(\bar{\tau}, f)$, under consideration away from its maximum. This threshold is defined to meet a specific requirement in terms of the probability of false acquisition and depends on the application.

If the comparison is positive in any of the Doppler cells, satellite emitter detection is declared and subsequently the near-far problem detection step is performed. Otherwise, if no significant correlation peak is found, coarse acquisition is repeated for another satellite emitter in the signal $x(nT_s)$.

In prior art processing methods, only the maximum value of the squared correlation matrix $X_i(\bar{\tau}, \bar{f})$ is compared to a threshold and, if found significant, used for carrier frequency shift and code delay estimation. However, the present invention takes into account that the "dominant" peak could actually come from interference from a stronger satellite emitters. In this case, since interference is a phenomenon depending upon Doppler frequency [Kaplan, 1996], the "real" correlation peak coming from the satellite emitter under search can appear in a different Doppler cell at a lower level. For this reason, the method of the invention takes into account the peaks for any Doppler cell and uses the near-far problem detection step to spot out those which are strongly affected by interferences.

The subsequent near-far problem detection step (step 3 in FIG. 4) only takes into account Doppler cells for which the correlation peak has been determined, in the preceding step, to be possibly representative of an individual signal. For each such Doppler cell f, the vector $X_i(\bar{\tau}, f)$ of squared correlation values for the different delay cells $\tau$ is processed in order to find out whether the peak detected in that Doppler cell either comes from the satellite emitter under search or is due to interference from other stronger emitters. This interference is caused by the fact that the cross-correlation among the different codes is not zero. The algorithm is described as follows, with reference to the flow-chart of FIG. 6.

First of all (block 30 on FIG. 6), a Doppler cell $f_0$ is selected from the set of Doppler cells whose correlation peak has been determined to be significant. Let $X_i(\bar{\tau}, f_0)$ be the vector of the squared correlation values for $f=f_0$ and for all the possible values of delay $\tau$, $\tau^*_{f0}$ the delay at which $X_i(\bar{\tau}, f_0)$ reaches its maximum value and $X_i(\tau^*_{f0}, f_0)$ said maximum value.

Then (block 31), the values of $X_i(\bar{\tau}, f_0)$ for $\tau=\tau^*_{f0}$ and for adjacent delays within a range of $T_c$ are removed from said correlation vector. The number of samples to remove in order to get rid of the lobes of the correlation peak is typically $2T_c f_s+1$. Under the hypothesis of no near-far problem (i.e. no interferences) and for high values of $N_I$, the remaining samples of $X_i(\bar{\tau}, f_0)$ constitute a sort of "background noise", approximately following a Gaussian distribution with mean $\mu$ and standard deviation $\sigma=\mu/\sqrt{N_I}$. An estimate of the mean can be obtained by the sample mean $\hat{\mu}$, providing the standard deviation estimate $\hat{\sigma}=\hat{\mu}/\sqrt{N_I}$. Otherwise stated, sub-step 31 comprises the computation of a standard deviation estimation of the distribution of the correlation values $X_i(\bar{\tau}, f_0)$ for all the trial code delays in the considered Doppler cell, excluding by the standard deviation estimation calculation the correlation peak as well as correlation values for trial delays adjacent to said peak.

Figure 6:
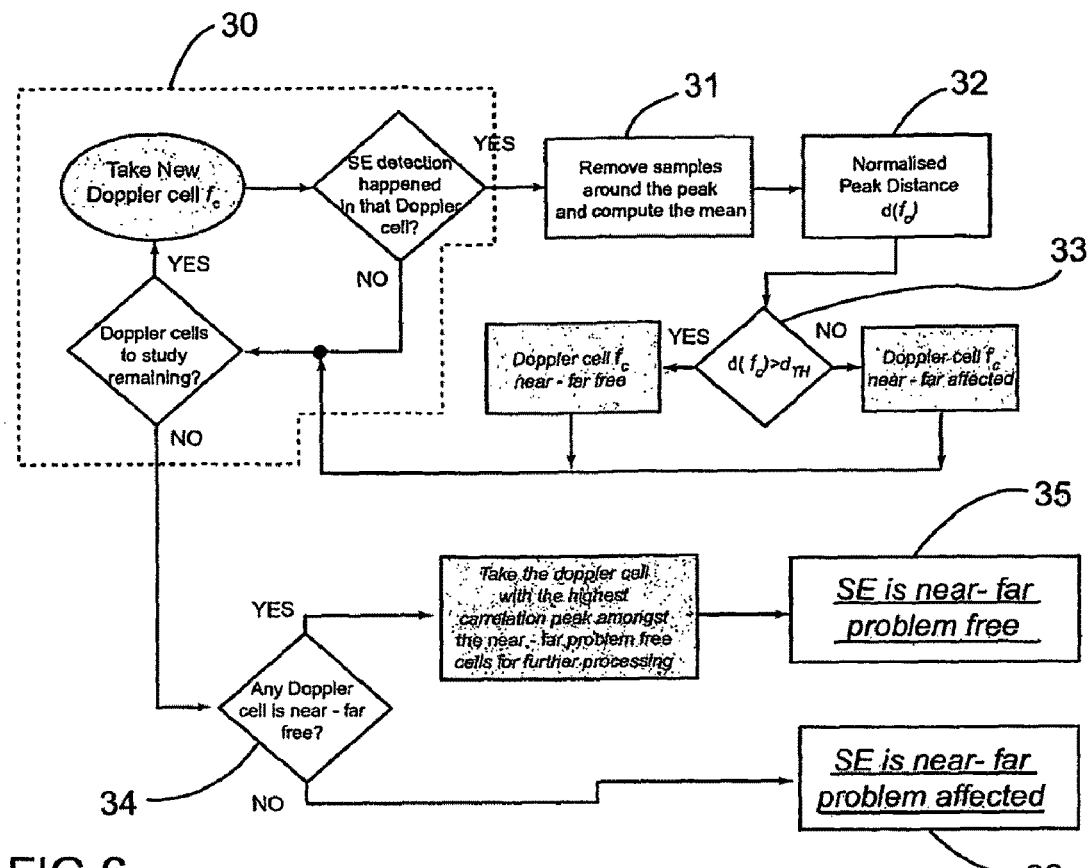
FIG. 6, a flow-chart of the "near-far problem" detecting algorithm according to the invention.

At block 32 of FIG. 6, the maximum of the squared module of the vector with the remaining samples, i.e. the secondary peak of $X_i(\bar{\tau}, f_0)$, is identified; let $X_i(\tau'_{f0}, f_0)$ be said secondary maximum and $\tau'_{f0}$ the corresponding code delay. Then, the difference between the main peak and the secondary peak is computed and normalized to the standard deviation estimate $\hat{\sigma}$, the result being called "normalized peak distance"

$$d(f_0) = \frac{X_i(\tau^*_{f0}, f_0) - X_i(\tau'_{f0}, f_0)}{\hat{\sigma}}.$$

At block 33, the normalized peak distance is compared to a threshold value $d_{th}$: if $d(f_0)$ is greater than said threshold, the $f_0$ cell is considered to be interference-free (free from the "near-far problem"), otherwise it is considered to be affected by interferences. Of course, it would be perfectly equivalent to consider a non-normalized peak distance and to compare it to a threshold proportional to the standard deviation estimate.

The preceding operations 30-33 are performed for all "significant" Doppler cells (i.e. cells for which block 2 in FIG. 4 has found a peak above the threshold) for the i-th modulating code (and therefore for the i-th satellite emitter). When all Doppler cells have been processed, it is considered whether any of them has been considered to be interference-free (block 34). If this is the case, the i-th satellite emitter is considered to be "near-far problem free" (even if some Doppler cells are actually affected by the near-far problem). In this case, the correlation peak having the greatest magnitude among the Doppler cells which have been determined to be interference-free is taken as the overall correlation peaks, and the corresponding Doppler frequency and code delay values, denoted $\hat{f}_i$ and $\hat{\tau}_i$ respectively are taken as coarse estimations of the actual carrier frequency shift and code delay of the i-th emitter. It is not useless to further underline the difference with respect to the prior art method: instead of taking the absolute maximum of the whole correlation matrix, which could be an artifact due to interference, the method of the invention only considers the Doppler cells which are likely to be substantially unaffected by interference and whose peak has been tested to be "significant", i.e. not due to noise, during the SE detection step.

If no Doppler cell for the i-th modulating code is found to be near-far problem free, the i-th satellite emitter is considered to be affected by the near-far problem and is added to a list of "weak" satellite emitters (block 36). Signals coming from such "weak" emitters are not used for positioning, at least at this stage of the method.

It is important to observe that the near-far problem detection method of the invention allows fast rejection of signals affected by interferences soon as they are processed. Prior art methods try to detect the near-far problem only after all the satellite emitters have been searched for. Therefore the method of the invention is much more efficient, simpler and faster.

Moreover, the normalized peak distance approach of the invention shows significantly improved performances with respect to prior art test for the near-far problem, such as the probability estimation approach suggested by [Lopez-Risueno, 2004, 2005a, 2005b]. Comparison between FIGS. 5A and 5B allows understanding why the normalized peak distance is such a powerful indicator of the near-far problem.

Figure 5A:
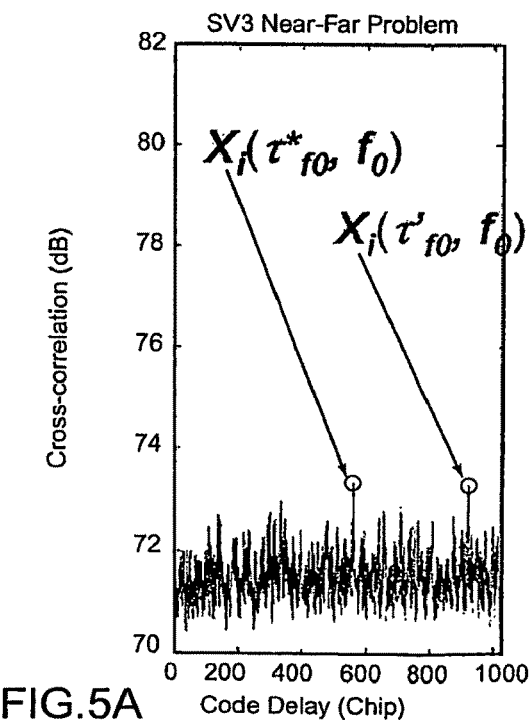
FIGS. 5A and 5B, plots of the squared correlation versus code delay for two "Doppler cells", one of which is affected by the "near-far problem"

FIG. 5A shows a correlation trace of a satellite emitter $X_i(\tau, f_0)$ wherein the main peak $X_i(\tau^*_{f0}, f_0)$ and the secondary one $X_i(\tau'_{f0}, f_0)$ have a very similar magnitude, with respect to the background noise. One of these peaks is the "true" correlation peak, useful for positioning, while the other one is an artifact induced by interference: since the two peaks have a small normalized distance, it is not possible to discriminate between them. Therefore, the correlation trace has to be considered affected by the near-far problem and have to be discarded.

Figure 5B:
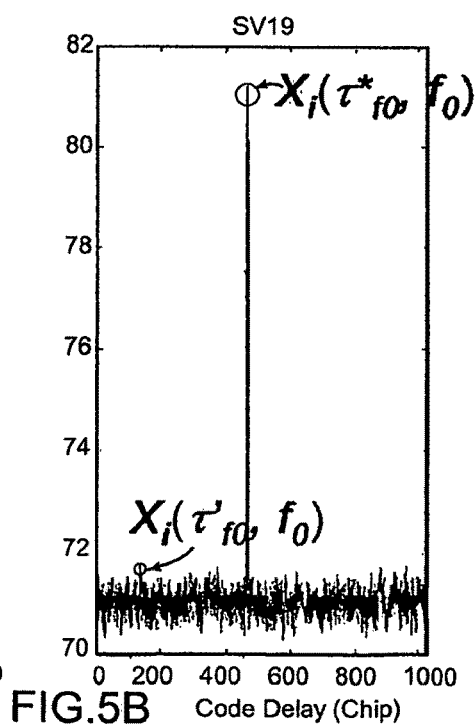

On the contrary, FIG. 5B shows a correlation trace wherein the magnitude difference between the main peak $X_i(\tau^*_{f0}, f_0)$ and the secondary one $X_i(\tau'_{f0}, f_0)$ is much greater than the background noise amplitude. It can then be safely assumed that the main peak is due to code correlation and the secondary one to weak interferences from other satellite emitters. Therefore, this correlation is substantially unaffected by the near-far problem.

Normalization of the peak distance is useful in order to make the near-far test independent from the noise power.

At the issue of the near-far problem detection step for a satellite emitter which turns out to be substantially interference-free, an estimation $(\hat{f}_i, \hat{\tau}_i)$ of the "Doppler" carrier frequency shift and of the code delay of said emitter is obtained. However, the time resolution in the estimation of the code delay, which is equal to the sampling period, is not sufficient for a good-quality estimation of the satellite pseudorange, and therefore for precise positioning. In conventional GNSS receiver this problem is solved by tracking, but as already discussed this technique is not well suited for "indoor" applications.

As suggested in the U.S. Pat. No. 5,663,734, issued to Krasner and the U.S. Pat. No. 6,795,771 issued to Fuchs et al, interpolation can be used in order to improve the delay estimate. Nevertheless, it has been found that the use of interpolation at this stage does not lead to better estimates for a general sampling frequency $f_s$. The reason for this is twofold. First, the correlations performed in the coarse acquisition stage are based on the FFT, which implies the substitution of the desired linear correlation between incoming signal and the replica code by circular correlations. Circular correlations are equivalent to the linear ones if one or both the incoming signal and the replica code are periodic with a period equal to the FFT processing length, that is to say, if $f_s \cdot \text{CodePeriod}$ is an integer number equal to $L_c$. For a general sampling frequency $f_s$, this condition must not be fulfilled. Second, even small errors in the Doppler frequency estimation give rise to significant errors in the squared correlation due to the Doppler in the code when long dwell times are used, like in the case of indoor GNSS receivers.

Therefore, the present invention comprises, prior to an interpolation step which will be subsequently described, a fine acquisition step (block 4 on FIG. 4) comprising re-computing the squared correlation matrix around the maximum peak found by coarse acquisition (at delay $\hat{\tau}_i$ and Doppler $\hat{f}_i$) for the delay and Doppler cells adjacent to the squared correlation peak, including the peak itself and using a greater Doppler resolution than in the coarse acquisition step. Preferably, in the fine acquisition step correlation is performed directly, using Equation 1 instead of the FFT method, i.e. a linear correlation is performed instead of a circular one.

The improved required Doppler resolution $\Delta f_{fine}$ is no longer inversely proportional to $N_c \cdot \text{CodePeriod}$ like $\Delta f_{coarse}$, but to the total dwell time $N_c \cdot N_I \cdot \text{CodePeriod}$. A suitable Doppler resolution for this fine acquisition stage is:

$$\Delta f_{fine} \leq \frac{2\Delta\tau \text{ (sec)}}{N_I N_c \text{CodePeriod (sec)}} f_{carrier} \text{ (Hz)}$$

where $f_{carrier}$ (in Hz) is the carrier frequency of the signal and $\Delta\tau$ (in seconds) is the maximum allowable error in the estimation of the code delay.

Concretely, fine acquisition implies, for each modulating code $c_i$:

determining a new set of trial values for the Doppler frequency $\tilde{f}$, including the previously estimated Doppler estimate $\hat{f}_i$; this new set is finer than the one used for coarse acquisition, i.e. $\Delta f_{fine} < \Delta f_{coarse}$, is advantageously centered on $\hat{f}_i$ and, in general, needs not to span a frequency interval larger than $2\Delta f_{coarse}$; it can therefore be conveniently defined as follows:
$\tilde{f} = \hat{f}_i + u\Delta f_{fine}$ with $u=0, \pm 1, \ldots, \pm U$, wherein $U=[\Delta f_{coarse}/2\Delta f_{fine}]$, i.e. the closest integer greater or equal to the ratio;

determining a new set of trial values for the code delay $\tau$, including the previously estimated Doppler estimate $\hat{\tau}_i$, advantageously centered on it and spanning a delay interval of $2T_s$. Unlike the new set of frequencies, the new set of code delays does not need, in general, to be finer than the one used for coarse acquisition. It can be conveniently defined as follows:
$\tilde{\tau} = \hat{\tau}_i + rT_s$ with $u=0, \pm 1/R, \ldots, \pm(R-1)/R, \pm 1$, with R positive integer. Typically R=1, which means that new set of trial values for the code delay $\tau$ only comprises three delay values: $\hat{\tau}_i - T_s$, $\hat{\tau}_i$ and $\hat{\tau}_i + T_s$;

locally generating coded modulated signals defined by the modulating code $c_i$, code delays $\tilde{\tau}$ and Doppler frequencies $\tilde{f}$ and correlating them with the received positioning signal x.

The linear correlation operation provides a new correlation matrix $X_i^{lin}(\tilde{\tau}, \tilde{f})$. The delay and Doppler values $(\tilde{\tau}_i, \tilde{f}_i)$ which maximize the squared module of said correlation matrix can be taken as improved estimates of the actual code delay and Doppler frequency shift associated to the i-th satellite emitter, using the i-th modulating code $c_i$.

It is possible to further improve the code delay estimation by applying interpolation to the vector of linear correlations corresponding to the fine Doppler frequency shift estimation $X_i^{lin}(\tilde{\tau}, \tilde{f}_i)$: this is step 5 on FIG. 4. As suggested by U.S. Pat. No. 5,663,734 any polynomial interpolation can be successfully used. However, for efficiency purposes quadratic or linear-piecewise interpolation are preferred. The latter interpolation technique is particularly advantageous, as discussed in paragraph 3.1 of [Lopez-Risueno, 2004].

It is worth underlying that, although the interpolation step by itself is known from prior art, its combination with the fine acquisition step constitute a new advantageous feature of the present invention.

After having found the Doppler $\tilde{f}$ and delay $\tilde{\tau}_i$ estimates and the corresponding square-module correlation peak $X_i^{lin}(\tilde{\tau}_i, \tilde{f}_i)$, the carrier-to-noise spectral density ratio (C/No) can be calculated as follows (block 6 on FIG. 4):

$$C/No_i \text{ (dBHz)} = 10\log_{10}\left[\frac{X_t^{lin}(\tilde{\tau}_i, \tilde{f}_i)B_n - \hat{P}f_s L_c N_c}{(L_c N_c)^2 \hat{P} - X_t^{lin}(\tilde{\tau}_i, \tilde{f}_i)}\right]$$

where $\hat{P}$ is the power estimate of signal $x(nT_s)$ in the "snapshot" under processing, $B_n$ is the receiver bandwidth and $f_s$ is the sampling frequency.

The equation above is the adaptation for the digital domain of the expressions provided by the inventors in previous work for continuous-time signals [Lopez-Risueno, 2004, 2005a, 2005b]. Note that in [Lopez-Risueno, 2004, 2005a], the equation is mistyped—see Equation (7) in [Lopez-Risueno, 2004], and Equation (11) in [Lopez-Risueno, 2005a], respectively. In [Lopez-Risueno, 2005b], it is correctly written—Equation (5). This C/No estimate is appropriate for the acquisition stage and, specially, for the acquisition of weak signals. It overcomes the impairment due to small errors on Doppler synchronization suffered by the C/No estimate used in most GNSS receivers (also known as van Dierendonck's C/No estimate) [Parkinson, 1996].

Besides being an indicator of the quality of the Doppler and delay estimations, the C/No estimate is used in the framework of the invention, for spotting out "strong" satellite emitters which are likely to be the origin of the "near-far problem" affecting the signals coming from other emitters (called "weak" emitters, see the description of the near-far problem detection step). The receiver sensitivity is defined as the minimum C/No allowing coarse acquisition with a specified probability of false alarm $P_{FA}$ and probability of detection $P_D$. A "strong" satellite emitter is an emitter whose transmitted signal reaches the receiving unit with a C/No which is much higher than the sensitivity.

Therefore, the "strong" emitters detection step (block 7 on FIG. 4) simply comprises comparing the C/No value obtained in the previous step with a threshold $TH_{cn}$ given by the sum of sensitivity (in dBHz) and a margin M (in dB). The margin M depends on the cross-correlation between the modulating codes used in the positioning systems; for instance, for the GPS L1 C/A signals, M is typically set to 18 dB.

The "strong" satellite emitter check ends the processing of the individual signal generated from the i-th satellite emitters. Then, if the list of in-view satellites is not exhausted, processing of the signal generated by the (i+1)-th satellite emitter begins.

After all satellite emitters have been taken into accounts, two scenarios are possible:
  if a sufficient number of $(\tilde{\tau}_i, \tilde{f}_i)$ estimations (4 or 5, depending on whether the navigation messages carried by the individual signals can be retrieved or not, and on the quality of the synchronization, has been performed, positioning is possible without further processing;
  otherwise, if the number of acquisition is insufficient, an additional near-far problem mitigation step has to be performed, in order to retrieve useful information from previously discarded "weak" (i.e. near-far problem affected) satellite emitters.

Of course, the near-far problem mitigation step can also be performed if a sufficient number of estimations is available, in order to improve positioning accuracy.

As a list of strong satellite emitters is already available, the sources of near-far problem affecting the weak satellite emitters are known. Estimates of delay, Doppler and C/No of strong signals are known, but no phase estimation is available, since phase information is destroyed in the non-coherent integration. Additionally, phase is difficult to estimate it in indoor environments, since the power level of the signals, even the strongest ones, is very low, and tracking is not performed. For that reason, the pre-correlation cancellation by direct reconstruction of the strong satellite emitters signals, described in the U.S. Pat. No. 6,236,354 issued to Krasner, is not applicable.

Instead, the present invention comprises an interference cancellation method based on subspace projection. A subspace projection method is already known from [Morton, 2003], but it needs knowledge of the phase of the strong interfering signal, and therefore is not suitable for indoor applications. The method according to the invention does not estimate nor use the phase of the strong signals, does not involve matrix operations, such as inversion, and is able to deal efficiently with long dwell times. This method, globally referred to as step 8, will be now described with reference to FIG. 7.

First of all (block 80 on FIG. 7), $L_c N_c$ samples are taken from the received positioning signal $x(nT_s)$: this is not essential but it is advantageous, for the sake of efficiency, to perform subspace cancellation in blocks of $L_c N_c$ samples.

Let K be the number of "strong" satellite emitters; for each strong emitter k, k going from 1 to K, a signal replica is generated using the corresponding modulating code and the previously determined code delay and Doppler estimates (block 81)

$$s_k(nT_s) = c_k(nT_s - \tilde{\tau}_k) \cdot \exp(2\pi \tilde{f}_k nT_s)$$

For convenience, the strong satellite emitters are ordered by decreasing C/No estimate, but this is not an essential feature.

The signals $\{s_k(nT_s)\}_{k=1 \ldots K}$ form a linear independent system of K vectors. Gram-Schmidt orthogonalization (block 82) allows building an equivalent orthonormal system $\{v_k(nT_s)\}_{k=1 \ldots K}$:

$$\begin{cases} k = 1: v_1(nT_s) = \dfrac{s_1(nT_s)}{\sqrt{L_c N_c}} \\ k = 2 \ldots K: v_k(nT_s) = \dfrac{\tilde{v}_k(nT_s)}{\|\tilde{v}_k(nT_s)\|} \\ \qquad \tilde{v}_k(nT_s) = s_k(nT_s) - \sum_{j=1}^{k-1} \langle s_k(nT_s), v_j(nT_s)\rangle v_j(nT_s) \end{cases}$$

where $\langle a(n), b(n)\rangle$ is the inner product of vectors $a(n)$ and $b(n)$, defined as $\langle a(n), b(n)\rangle = \Sigma a(n) \cdot b^*(n)$ ("*" meaning the complex conjugate), and $\|a(n)\|$ is the norm, i.e. $\|a(n)\| = \sqrt{\langle a(n), a(n)\rangle}$.

Interference ("near-far problem") cancellation (block 83) is obtained by taking the orthogonal complement $x_c(nT_s)$ of the received signal with respect to the subspace spanned by $\{s_k(nT_s)\}_{k=1 \ldots K}$ or, equivalently, by $\{v_k(nT_s)\}_{k=1 \ldots K}$:

$$x_c(nT_s) = x(nT_s) - \sum_k \langle v_k(nT_s), x(nT_s) \rangle v_k(nT_s)$$

and saving it in memory (block 84).

The preceding steps are then repeated for the following block of $N_cL_c$ samples of signal $x(nT_s)$.

After the orthogonal complement has been computed for all the $N_iN_cL_c$ samples, the method described with reference to FIG. 4 (coarse acquisition, satellite emitter identification, near-far problem detection, C/No estimation and strong satellite emitters check) is performed again, but only for satellite emitters which had been previously considered as "weak". For this new execution, the list of weak satellite emitters is cleared, and may be filled again. In fact, some satellite emitters will be again declared affected by the near-far problem, while other will not, and the latter will be used to compute new delay and Doppler estimates ($\tilde{\tau}_i, \tilde{f}_i$). Some satellite emitters, which had been previously considered "weak", will now be included in the list of strong emitters: this means that, although before cancellation they were interfered from much stronger emitters, they are strong enough to induce near-far problem to even weaker ones.

The whole process is repeated until a suitable stopping criterion is met. Examples of suitable criteria are: no more emitters have been declared as "strong", the list of "weak" emitters is empty or a maximum number of iteration has been reached.

The previously described embodiment of the invention is suitable when the individual signals generated by different satellite emitters are searched for in a sequential way. However, some receiving units allow simultaneous acquisition of several satellite emitters, and in this case a modified embodiment of the invention turns out to be more advantageous. As it can be seen on FIG. 8, this embodiment differs from the previously described one in that the near-far problem cancellation of a "strong" satellite emitter (block 8) is performed right after said strong emitter has been identified as such, i.e. without waiting for the acquisition of all the in-view satellite emitters. After all the in-view satellite emitters have been acquired, the method can be repeated for the "weak" emitters. This embodiment has the advantage of reducing the number of iterations compared to the previous one since the detection of some satellites will not be affected by the near-far problem (and hence these satellite emitters will not be included in the list of weak satellite emitters at the first attempt of acquiring them) as the contribution to the signal of the strong satellite emitters is removed as soon as they are acquired.

Figure 9:
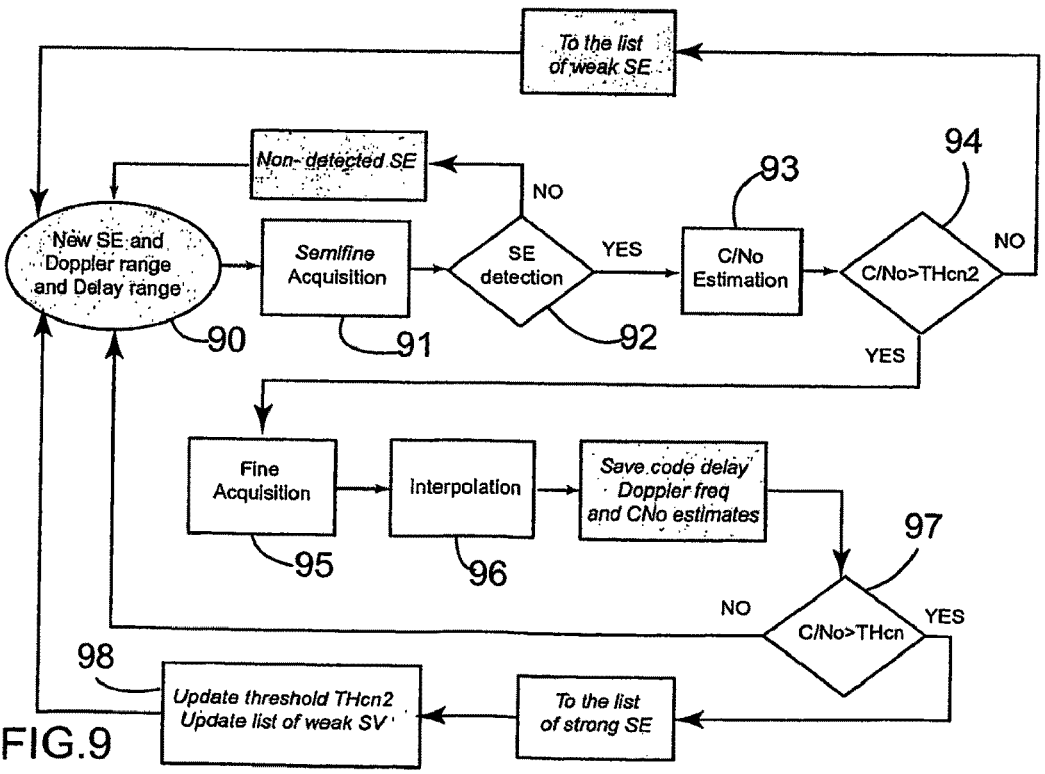
FIG. 9, a flow-chart of a third embodiment of a processing method according to the invention.

A third embodiment, reducing the computational burden on the Signal Processing Unit will now be described with reference to FIG. 9. This embodiment is not suitable to "stand alone" operation, since it relies on assistance information coming from a nearby, terrestrial Location Server. Moreover, this assistance information has to comprise, beside a list of in-view satellite emitters, a list of the code delays for said satellite emitters (or at least of the differences in code delay between the emitters).

The third embodiment of the invention comprises using the method of the first or second embodiment until a "reference" near-far free satellite emitter is acquired and recognized as such. From that point on, the much simpler method of FIG. 9 can be used.

At step 90, assistance information is used to determine a comparatively narrow set of trial code delay values: in fact, the difference between the code delay of a given satellite emitter and that of the "reference" satellite emitter as measured by the receiving apparatus implementing the invention will certainly not differ much from the same difference as measured by the Location Server receiver. More precisely, let $d_{MAX}$ be the maximum conceivable distance between the receiving apparatus and the Location Server receiver, $e_i$ the elevation angle for generic satellite i and $e_1$ the elevation angle for the "reference" satellite. The difference between the code delay for satellite emitter i and the reference satellite emitter is slightly different when it is measured at the receiving apparatus or at the Location Server receiver. The difference between these two code delay differences can be safely considered to be bounded by $$\Delta \tau_i = \pm \frac{d_{MAX}[\cos(e_i) + \cos(e_1)]}{c}.$$

Therefore, the set of trial delay values for correlation and acquisition of satellite emitter i needs only span a range of $2\Delta\tau_i$. For instance, for a maximum distance $d_{MAX}$=3 km, $e_i$=30° and, $e_1$=70°, $\Delta\tau_i$=±12.08 μs. For the GPS L1 C/A signals (CodePeriod=1 ms, 1023 chips per code period), this means that only a range of ±12.35 chips must be searched, instead of 1023.

Figure 2:
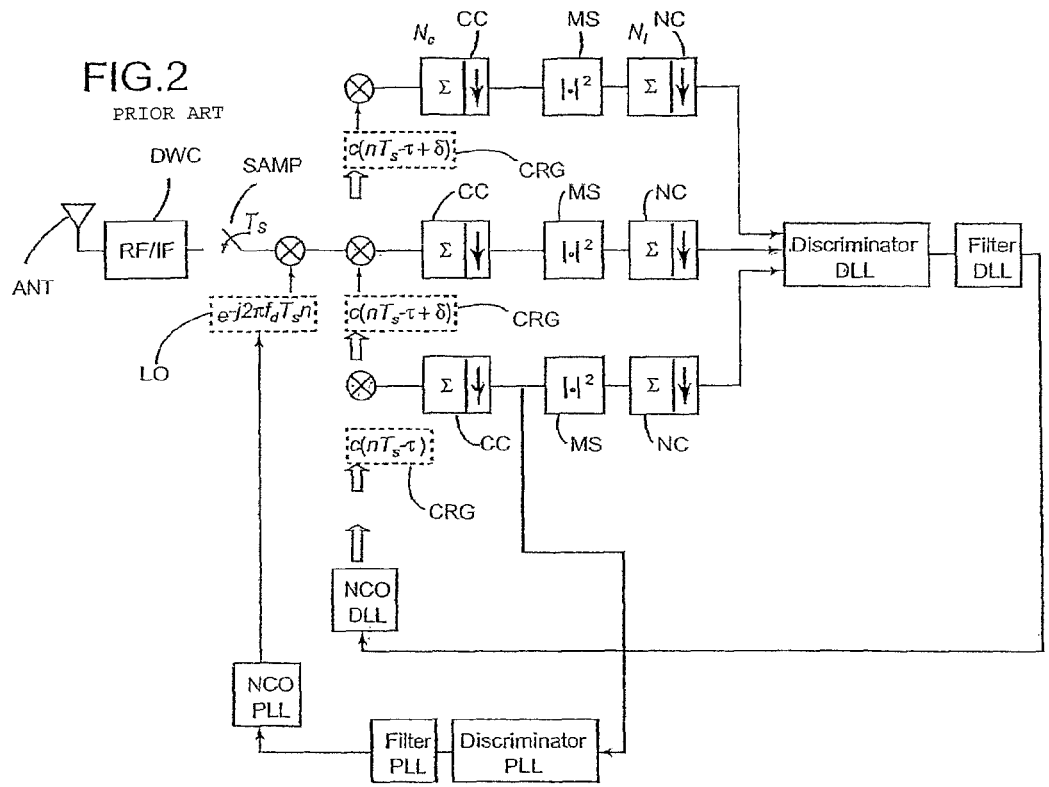
FIG. 2, a block diagram of a tracking stage of a prior art

Since the number of trial code delays can be reduced in such a high extent, coarse acquisition by use of the FFT can be removed and replaced by a "semifine acquisition" step (block 91 on FIG. 9) wherein:

the correlation between the received signal and the locally generated replica is a linear correlation, and not a circular correlation based on the FFT;

delay resolution can be even coarser than in the "coarse acquisition" step of the method described with reference to FIG. 2, i.e. greater than $T_s$;

Doppler resolution is of the same order as $\Delta f_{coarse}$.

The satellite emitter detection step (block 92) is performed as in the previously described embodiments.

C/No estimation (block 93) is performed right after the detection step, while in other embodiments it follows near-far problem detection. This is because, in the present embodiment, a simplified approach to near-far problem detection is used (block 94). The estimated C/No is compared a threshold THcn2 to determine whether the satellite emitter can be prone to be affected by the near-far problem. The threshold THcn2 can be defined as a C/No level below the maximum C/No among the satellite emitters already acquired. For GPS L1 C/A signals, typically a value of 18 dB below the maximum C/No is used. That is, THcn2 can vary along the time. If the satellite emitter signal under search has a C/No estimate below THcn2, it is included on the list of weak satellite emitter and another emitter from the list of in-view satellite emitters is looked for. Otherwise, fine acquisition (block 95) and interpolation (block 96) are carried out. Finally, the C/No estimate is compared to the threshold THcn to perform a Strong-satellite emitter check (block 97). Like in previous embodiments, if declared strong the emitter it is included on the list of strong satellite emitters. The threshold THcn2 is updated (block 98) and it is checked if any of the non-weak satellite emitters previously acquired can have a C/No estimate below this new threshold. In that case, they would be included on the list of weak emitters.

Figure 7:
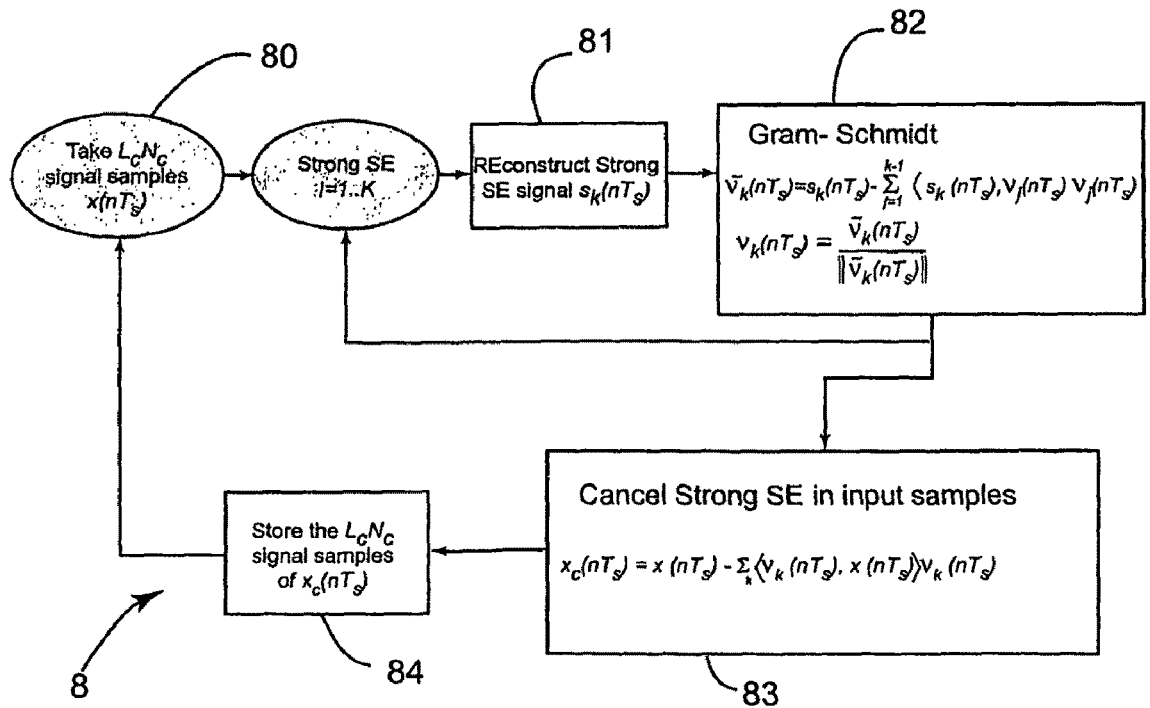
FIG. 7, a flow-chart of the "near-far problem" cancellation algorithm according to an embodiment of the invention.

When all the in-view satellite emitters have been searched for, the near-far problem mitigation step can be carried out, as already described with reference to FIG. 7.

The above-described apparatus and methods are also applicable to direct-sequence modulated signals using subcarrier modulation, like the typical binary offset carrier modulation appearing in several Galileo signals [Hein, 2002]. This is achieved by considering the code as the product of the code itself and the subcarrier.

Figure 8:
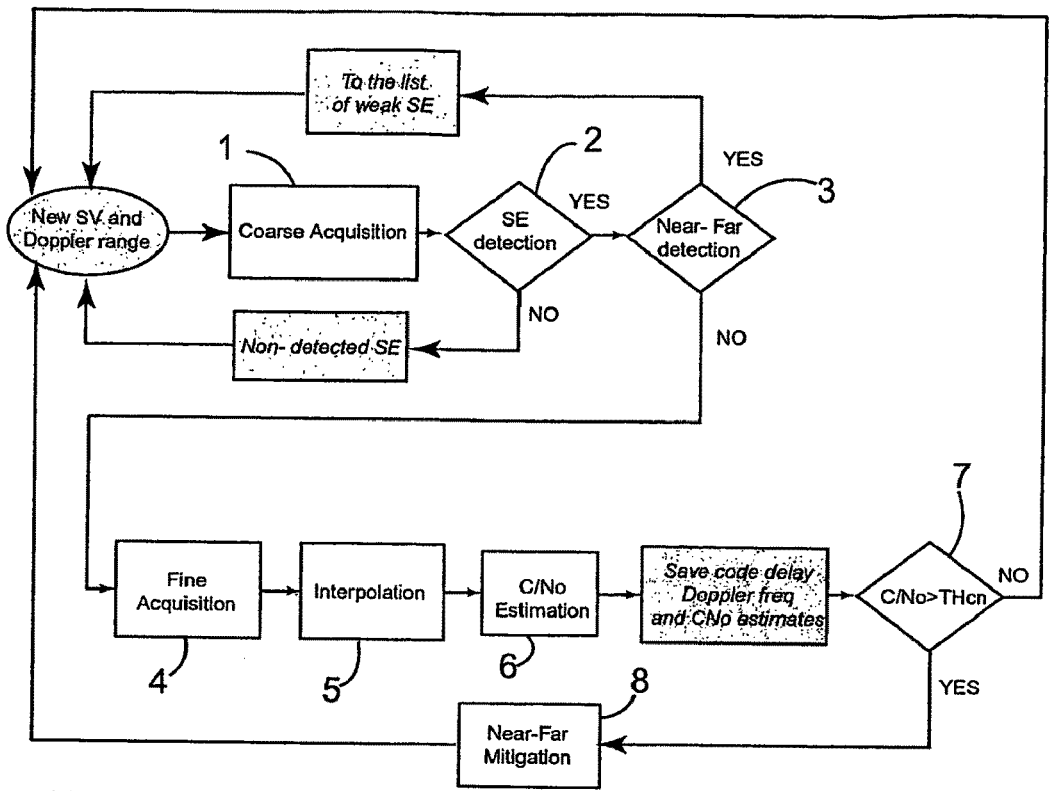
FIG. 8, a flow-chart of a second embodiment of a processing method according to the invention.

With respect to the complexity of the described apparatus and methods, the use of rewritable memory in the apparatus and the use of fine acquisition in the embodiments of FIGS. 4 and 8 can increase the complexity regarding prior art. Nevertheless, this is compensated for by the important increase in performance: The ability to store again processed samples (e.g. after near-far problem mitigation), and the accuracy in the code delay estimation even for long dwell times, that is to say, for very weak signal environments. In the case of the embodiment of FIG. 9, the whole embodiment has lower complexity than prior art receivers since coarse acquisition is no required for the second and subsequent satellite emitters to look for.

The technical results of the first embodiment of the invention (FIG. 4) applied to GPS L1 C/A signals will be now discussed. It should be considered that all conclusions drawn from the analysis of the results are also valid for the other embodiments (FIGS. 8 and 9) since they are variations of the one in FIG. 4 and are based on the same building methods. The use of GPS signals does not limit the applicability of the results to this particular system either, but on the contrary, it is adds to their validity because it allows us to employ real measurements. Notwithstanding, the conclusions are also valid when the invention is applied to any direct-sequence spread spectrum system.

First of all, we consider the improvements over the prior art which are obtained by the combination of coarse acquisition, fine acquisition and interpolation. Coarse acquisition plus interpolation is the typical configuration used in the prior-art receivers not using tracking, as in U.S. Pat. No. 5,663,734, issued to Krasner. FIGS. 10A and 10B compares the error in code delay estimation when using coarse acquisition alone (C) or coarse acquisition followed by fine acquisition (C+F), but no interpolation. The estimation error is computed for the all possible code delays of the incoming signal (from 0 to 1023 chips, with small resolution, i.e. not limited to integer chip values), and the incoming signal is computer-generated without noise and 8 bits uniform quantization; only the signal coming from a satellite emitter is considered and the Doppler frequency is zero. Automatic gain control setting the optimal amplitude for the analog-to-digital converter is also used. The simulation employs a receiver with $N_c=10$ code periods of coherent correlation and $N_f=1000$ noncoherent blocks and sampling frequency $f_s=5.4559$ MHz. Both a receiver without (FIG. 10A) and with (FIG. 10B) bandwidth limitation are simulated; specifically, a 2-MHz bandwidth limitation is assumed. As can be noticed, for both receiver bandwidths, fine acquisition importantly reduces the error held by coarse acquisition. For coarse acquisition, it ranges from −0.15 to 0.15 chips; for fine acquisition, from −0.08 to 0.08 chips. That means an error in the pseudorange of ±45 meters and ±24 meters respectively. The impact in the position error can be twice, three times or even more depending on the dilution of precision of the constellation [Kaplan, 1996], which is usually high in indoor environments [Peterson, 1995]. The error shown can be seen as a satellite-dependent (equivalently, code-delay dependent) bias due to the noise-free character of the simulations.

FIGS. 11A/11B and 12A/12B show the same comparison, but considering piecewise linear interpolation and quadratic interpolation respectively. More precisely:

On FIG. 11A, the C curve shows the error in code delay estimation when using coarse acquisition plus piecewise linear interpolation, while the C+F curve shows the error in code delay estimation when using coarse acquisition plus fine acquisition plus piecewise linear interpolation; in both cases the receiver is not band-limited.

On FIG. 11B, the C curve shows the error in code delay estimation when using coarse acquisition plus piecewise linear interpolation, while the C+F curve shows the error in code delay estimation when using coarse acquisition plus fine acquisition plus piecewise linear interpolation; in both cases the receiver has a 2-MHz bandwidth limitation.

On FIG. 12A, the C curve shows the error in code delay estimation when using coarse acquisition plus quadratic interpolation, while the C+F curve shows the error in code delay estimation when using coarse acquisition plus fine acquisition plus quadratic interpolation; in both cases the receiver is not band-limited.

On FIG. 12B, the C curve shows the error in code delay estimation when using coarse acquisition plus quadratic interpolation, while the C+F curve shows the error in code delay estimation when using coarse acquisition plus fine acquisition plus quadratic interpolation; in both cases the receiver has a 2-MHz bandwidth limitation.

Although interpolation improves the estimation for both coarse and coarse plus fine acquisition, the final error is always lower for coarse plus fine acquisition. Clearly, piecewise linear interpolation is more suitable for nonlimited bandwidth, i.e. wideband receivers, and quadratic interpolation is more appropriate for narrowband ones. For bandwidth non-limitation plus piecewise linear interpolation and bandwidth limitation plus quadratic interpolation, the code delay estimation error becomes negligible (after coarse plus fine acquisition), and of course much smaller than the one resulting from any combination of coarse acquisition plus interpolation. This is because piecewise linear interpolation assumes triangular shape of the correlation around the peak, which is typically achieved with wideband filtering. For narrowband filtering, the correlation peak becomes round, which is more similar to the parabolic shape assumed by the quadratic interpolation.

FIGS. 13A and 13B show the difference between the code delay estimation obtained by using coarse acquisition (C) or coarse plus fine acquisition (C+F) for live GPS L1 C/A signals collected in an indoor environment. The receiver configuration is: $N_c=10$, $N_f=500$, $f_s=5.4559$ MHz and a 3-MHz bandwidth. More precisely, FIG. 13A shows the squared correlation obtained by coarse acquisition; in FIG. 13B the squared correlation peak obtained by coarse acquisition is zoomed in and depicted along with the squared correlation computed by fine acquisition, i.e. using linear correlation. A shift in the peak position as well as a power level variation can be observed.

For the same collected samples and the same receiver configuration, the position has been computed for several consecutive 5-second snapshots. The samples where collected in the European Navigation Lab, ESTEC, ESA, The Netherlands, on the 1$^{st}$ floor of a 1-story building, on Jun. 11, 2004, at 9:06 am (local time). The satellite emitters in view and their Doppler are computed by another receiver operating outdoors, which acts as the location server. This set-up will be also used in the next sections. The sensitivity of the receiver for a probability of detection $P_D=90\%$ and a probability of false alarm $P_{FA}=10^{-8}$ at every decision is C/No=15.2 dBHz. No near-far problem was detected since all the satellite emitters detected indoors were between 15 and 32 dBHz, i.e. the range was 17 dB, which is below the margin necessary to suffer from near-far interference for GPS L1 C/A signals (M=18 dB). No satellite emitter has been considered to be "strong", i.e. suitable to produce interferences.

FIG. 14A displays the positioning error obtained by applying coarse acquisition followed by piecewise linear interposition (C) and coarse-plus-fine acquisition, also followed by piecewise linear interposition (C+F); the difference between these positioning errors is plotted on FIG. 14B. It can be seen that, for the majority of time fixes, fine acquisition improves the positioning accuracy by about 50 to 100 meters.

Figure 15A:
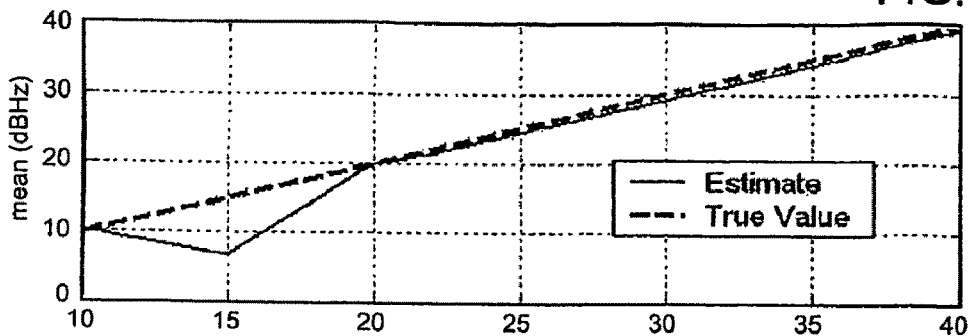
FIGS. 15A and 15B, two plots showing the performances of the carrier-to-noise spectral density ratio estimator according to the invention.
Figure 15B:
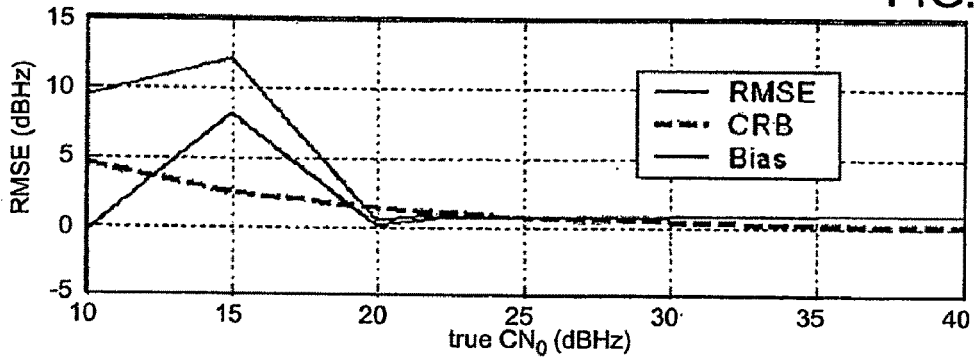

Even though the C/No estimator has been already presented in prior authors' work [Lopez-Risueno, 2004, 2005a, 2005b], its performances are discussed here in order to corroborate its validity even for C/No values as low as the sensitivity of the receiver, unlike other prior art C/No estimation methods which are only valid for tracking, and to demonstrate that the use of an C/No estimator with such good behavior at low signal values is very appropriate in specific points of the invented apparatus. In FIG. 15A, the mean estimation of the C/No is represented for a single signal with different C/No values; FIG. 15B shows the root-mean-square error of the estimate, its bias and, for comparison, the Cramer-Rao lower bound (CRB). The receiver configuration is $N_c=5$, $N_f=200$, $f_s=5.4559$ MHz and no limitation in band, that is, the sensitivity (measured for $P_D=90\%$ and $P_{FA}=10-8$) is C/No=20.4 dBHz. The good behavior of the estimator can be noticed for all C/No values above the sensitivity. Further, it approaches the Cramer-Rao bound for high C/No values.

Figure 16:
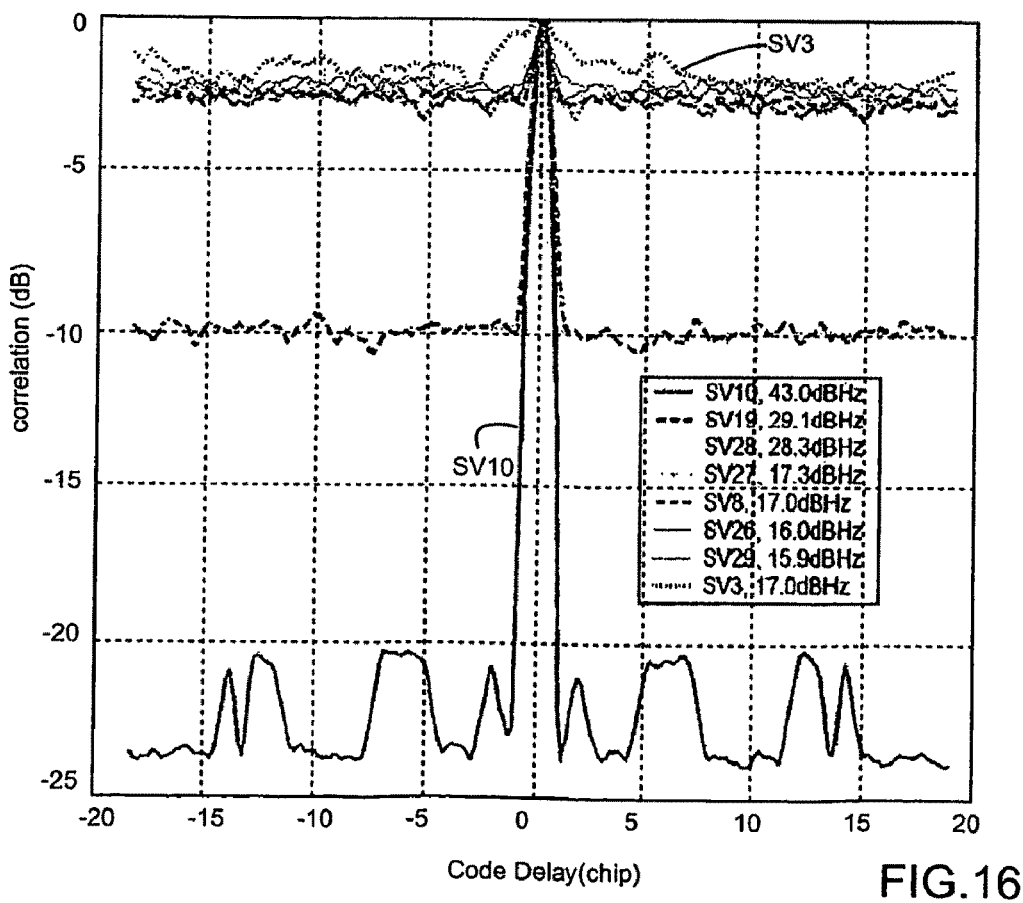
FIG. 16, a set of correlation traces for eight individual positioning signals generated by different satellite emitters.
Figure 17:
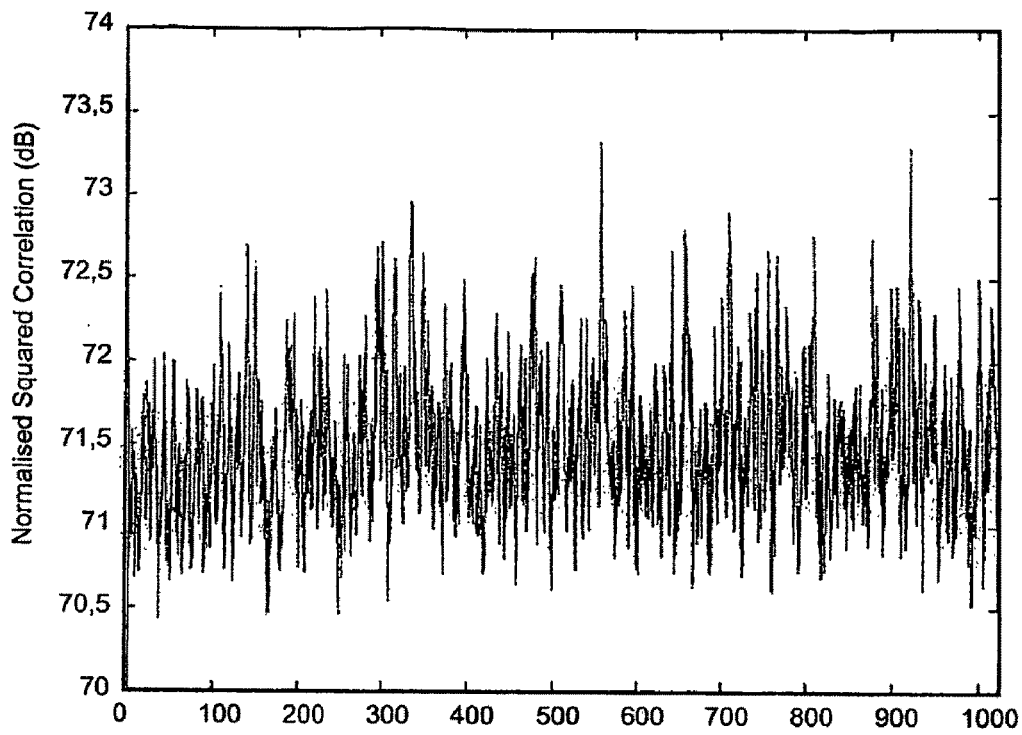
FIG. 17, a correlation trace of an individual signal affected by the "near-far problem"
Figure 18:
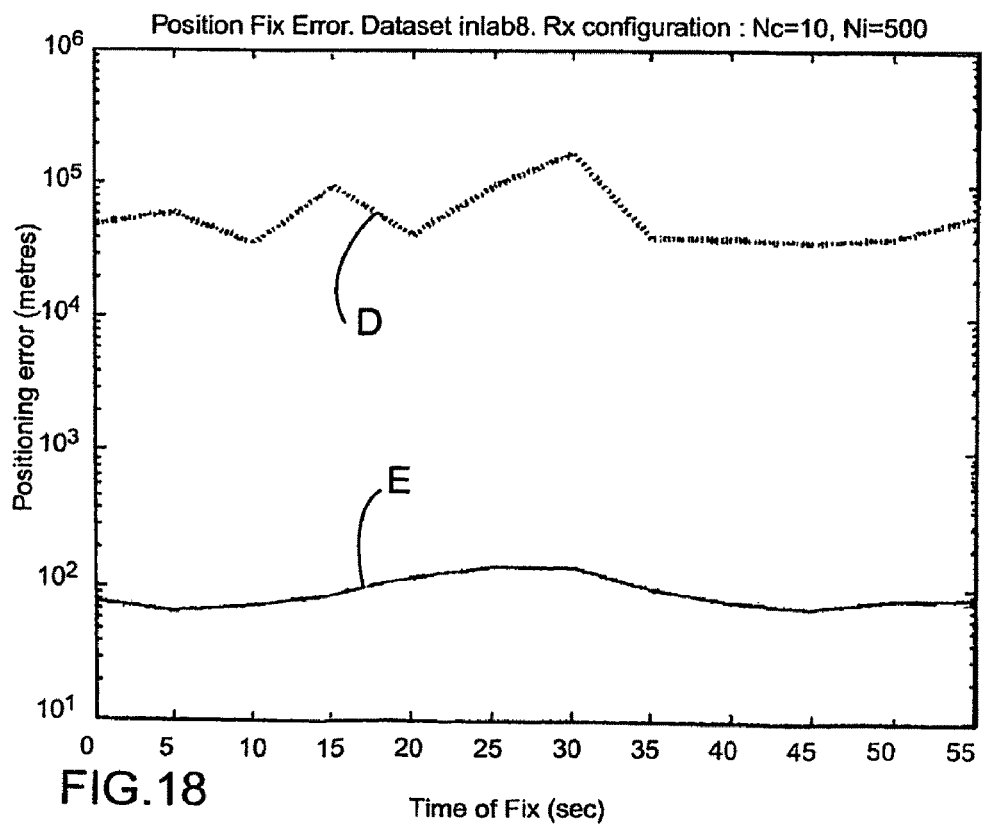
FIG. 18, a plot comparing the positioning error obtained with and without the "near-far problem detection" step of the invention.

In order to evaluate the performances of the near-far detection method according to the invention, a collected dataset comprising a signal coming from a "weak" (near-far problem affected) satellite emitter has been selected. The following configuration has been used: $N_c=10$, $N_f=500$, $f_s=5.4559$ MHz, a 3-MHz bandwidth, and $d_{th}=3.719$ for the near-far detector. The position has been computed for several consecutive 5-second snapshots. The samples where collected in the meeting room Df304 at ESTEC, ESA, The Netherlands, on the last floor of a 3-story building, on Jun. 1, 2005, at 7:00 pm (local time). The in view satellite emitters and their Doppler are determined by another receiver operating outdoors, acting as a Location Server. The sensitivity of the apparatus for $P_D=90\%$ and $P_{FA}=10^{-8}$ at every decision is C/No=15.2 dBHz. For the snapshot, the centered and normalized output given by the coarse acquisition block is plotted in FIG. 16; different satellite emitters are indicated as SV10, SV19, SV28, SV27, SV8, SV26, SV29 and SV3 ("SV" stands for "space vehicle"). Note the high C/No value of SV10 (C/No=43 dBHz), which can clearly generate near-far interferences on the weaker satellite emitters. In fact, SV3 is found near-far affected and SV10 is included on the list of strong satellite emitters. The squared correlation computed by the coarse acquisition is also plotted in FIG. 17 for illustration. Note that no clear peak is observed. In other snapshots not only SV3 is near-far affected but also SV8. The receiver adequately detects those situations and provides a good position fix within 100 meters error or less. FIG. 18 compares the position estimation obtained with the near-far problem detector enabled and disabled (E and D curves, respectively). With the detector disabled, the inclusion of the near-far affected satellite emitters erroneous code delay estimations results in a totally wrong position fix (error of the order of several tens of kilometers), which is reduced down to 100 meters or less when the near-far problem detector is enabled. It is also worth noting that, after applying the near-far problem cancellation, SV3 and SV8 are not even detected, which means that the initial detection was completely due to the near-far problem.

Figures 19A, 19B:
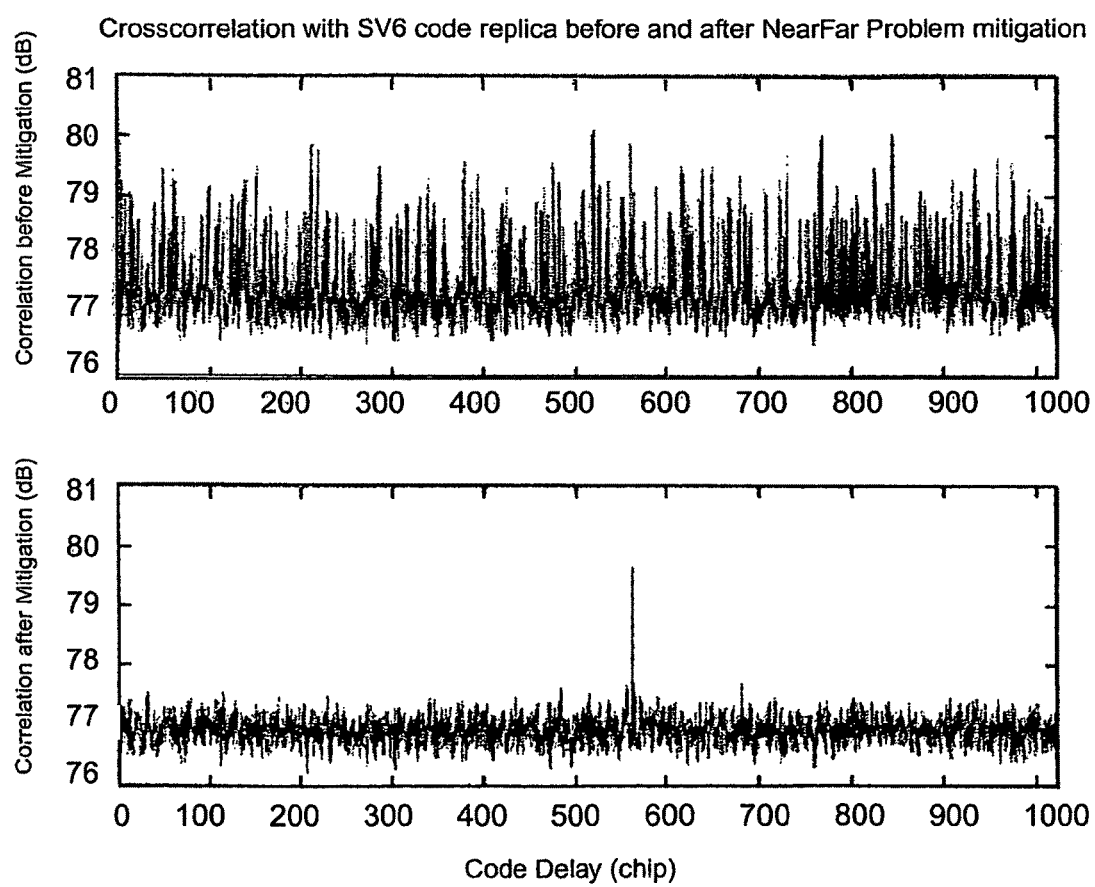
FIGS. 19A and 19B, two correlation traces of an individual signal, respectively before and after application of the interference cancellation method of the invention.

To show the advantages of the near-far problem cancellation technique, a synthetic example has been chosen with 2 strong and 2 weak satellite emitters. SV3 and SV17 have C/No equal to 55 and 50 dBHz, respectively; SV20 and SV6 have C/No equal to 26 and 20 dBHz, respectively. The receiver configuration is: $N_c=10$, $N_f=500$, $f_s=5.4559$ MHz and non-limited bandwidth. The sensitivity of the receiver for $P_D=90\%$ and $P_{FA}=10^{-8}$ at every decision is C/No=15.2 dBHz. Only SV6 is found near-far affected; SV20 is rightly estimated. SV3 and SV17 are correctly found to be strong satellite emitters, and they are successfully cancelled when the near-far problem cancellation method is executed. Afterwards, SV6 is checked again and correctly acquired. The C/No, code delay and Doppler estimates of the four satellite emitters are shown in Table 1 and are very close to true values. FIGS. 19A and 19B show the squared correlation by coarse acquisition for SV6 before (FIG. 19A) and after (FIG. 19B) near-far problem cancellation. Before cancellation no clear peak is observed; such a peak becomes apparent after the cancellation of the strong satellite emitters.

TABLE 1

| SV | C/No estimate and (true value), in dBHz | Code delay estimate and (true value), in samples | Doppler frequency estimate and (true value), in Hz |
|---|---|---|---|
| 3 | 54 (55) | 1500.16 (1500.3) | 90 (100) |
| 17 | 48 (50) | 18.72 (18.5) | −290 (−300) |
| 20 | 23 (26) | 2345.55 (2345.7) | 255 (255) |
| 6 | 19 (20) | 3000.35 (3000.25) | −50 (−50) |

Although the invention has been mainly described with reference to a GNSS, it more generally applies to any system that makes it possible the positioning of a receiver by means of the code delay estimation of direct-sequence code-modulated signals transmitted by several emitters placed in different locations, particularly when the receiver is situated in an environment severely affected by large and different signal attenuations and multipath. In particular, the invention applies to positioning in a code-division multiple access (CDMA) cellular communications system by means of the time of arrival of the signals received by a receiving unit. In that case, the transmitters are the base stations, which have a fix position. Assuming that the receiver position is only to be determined in a horizontal plane and that the receiving unit does not have the same time reference as the base stations, which is the usual situation, measurements to three stations are required. An example of this approach is the Observed Time Difference of Arrival (OTDOA) for CDMA [Sun, 2005]. The same previous discussion about the propagation indoors apply to the positioning in that kind of CDMA cellular communications systems, although they encounter the referred problems not only indoors but also outdoors [Sun, 2005].

Moreover, although assisted positioning is often used in indoor positioning applications, the invention can be successfully carried out in autonomous outdoor receivers.

In the exemplary embodiments which have been described here above, the processing method of the invention comprises a synergic combination of several processing steps, such as coarse acquisition followed by fine acquisition, interpolation, near-far detection and mitigation. However, processing methods comprising only some of these steps still achieve significant technical results. For example:
  the use of FFT and noncoherent integration for coarse acquisition are not essential, even if they are often advantageous;
  the combination of coarse and fine acquisition already provides an improved code delay estimation without the need for tracking; interpolation further improves this estimation, but is not essential;

the near-far problem detection technique of the invention can be applied independently from other processing steps;

the near-far mitigation technique based on Gram-Schmidt orthogonalization and subspace projection can be combined with a different near-far problem detection method.

NON-PATENT REFERENCES

[3GPP, 2005] 3rd Generation Partnership Project (3GPP), "Technical Specification Group Radio Access Network; Stage 2 functional specification of User Equipment (UE) positioning in UTRAN (Release 7)," Technical Specification TS 25.305 v7.00, 3GPP, 2005, http://www.3gpp.org

[CGALIES, 2002] Coordination Group on Access to Location Information for Emergency Services (CGALIES). Work Package 1, Technical report, CGALIES, 2002, http://www-.telematica.de/cgalies

[Glennon, 2004] Glennon, E. P., and Dempster, A. G., "A Review of GPS Cross Correlation Mitigation Techniques," in Proceedings of the 2004 International Symposium on GPS/GNSS (GNSS 2004), Australia, 2004.

[Hein, 2002] Hein, G. W., et al, "Status of Galileo Frequency and Signal Design," in Proceedings of the ION GPS 2002, 2002

[Kaplan, 1996] Kaplan, E. D. (editor). Understanding GPS: Principles and Applications. Artech House, 1996.

[La Mance, 2002] La Mance, J., de Salas, J., and Jarvinen, J., "Assisted GPS: A Low-Infrastructure Approach," GPS World, March, 2002, http://www.gpsworld.com

[Lachapelle, 2004a] Lachapelle, G, et al, "HSGPS Signal Analysis and Performance under Various Indoor Conditions," Navigation: Journal of The Institute of Navigation (ION), vol. 51, no. 1, Spring 2004.

[Lachapelle, 2004b] Lachapelle, G, "GNSS Indoor Location Technologies," in Proceedings of the 2004 International Symposium on GPS/GNSS (GNSS 2004), Australia, 2004.

[Lin, 2000] Lin, D. M., and Tsui, J. B. Y., "Comparison of Acquisition Methods for Software GPS Receiver," in Proceedings of the ION GPS 2000, 2000.

[Lopez-Risueno, 2004] Lopez-Risueno, G., and Seco-Granados, G., "Measurement and Processing of Indoor GPS Signals Using One-Shot Software Receiver," in Proceedings of ESA Navitec 2004, 2004.

[Lopez-Risueno, 2005a] Lopez-Risueno, G., and Seco-Granados, G., "Measurement and Processing of Indoor GPS Signals Using One-Shot Software Receiver," in Proceedings of the IEEE Vehicular Technology Conference Spring 2005, 2005.

[Lopez-Risueno, 2005b] Lopez-Risueno, G., Seco-Granados, G., and Garcia-Rodriguez, A., "Evaluation of GPS Indoor Positioning using Real Measurements and a One-Shot Receiver," in Proceedings of the European Navigation Conference ENC-GNSS 2005, 2005.

[Madhani, 2003] Madhani, P. H. et al, "Application of Successive Interference Cancellation to the GPS Pseudolite Near-Far Problem" IEEE Trans. on Aerospace and Electronic Systems, vol. 39, no. 2, April 2003.

[Morton, 2003] Morton, Y. T. J., "Assessment and Handling of CA Code Self-Interference during Weak GPS Signal Acquisition," in Proceedings of ION GPS 2003, 2003

[Otaegui, 2005] Otaegui, O., Urquijo, S., Rhomer, G., "Real Time Fast Acquisition based on Hardware FFT for a GPS/EGNOS Receiver," in Proceedings of the European Navigation Conference ENC-GNSS 2005, 2005.

[Pahlavan, 2002] Pahlavan, K., Li, X., and Mäkelä, "Indoor Geolocation Science and Technology," IEEE Communications Magazine, February, 2002.

[Parkinson, 1996] Parkinson, B. W. and Spilker, J. J. (editors). Global Positioning System: Theory and Applications. American Institute of Aeronautics and Astronautics, vol. 1, 1996.

[Peterson, 1995] Peterson, B., and Ottman, G., "GPS Receiver Structures for the Urban Canyon," in Proceedings of the ION GPS 1995, 1995.

[Psiaki, 2001] Psiaki, M. L., "Block Acquisition of Weak GPS Signals in a Software Receiver," in Proceedings of the ION GPS 2001, 2001.

[Smith, 1995] Smith, W. W. Handbook of Real-Time Fast Fourier Transform. Wiley, 1995.

[Spilker, 1977] Spilker, J. J. Digital Communications by Satellite. Prentice-Hall, 1977.

[Sun, 2005] Sun, G., Chen, J., Guo, W., and Liu, K. J. R., "Signal Processing Techniques in Network-aided Positioning," IEEE Signal Processing Magazine, July 2005.

[Syrjarinne, 2000] Syrjärinne, J, "Possibilities for GPS Time Recovery with GSM Network Assistance," in Proceedings of the ION GPS 2000, 2000.

[Tsui, 2005] Tsui, J. B. Fundamentals of Global Positioning Receivers: A Software Approach. Wiley, 2nd edition, 2005.

[Utlaut, 1978] Utlaut, W. F., "Spread Spectrum," IEEE Communications Magazine, September 1978.

The invention claimed is:

1. A method of processing a set of code-modulated positioning signals constituted by a superposition of individual signals generated by a plurality of emitters, the individual signal generated by each emitter being defined by a known modulation code, by an unknown code delay and by an unknown carrier frequency shift, the method comprising the steps of:

(a) receiving and down-converting said set of code-modulated positioning signals over a predetermined time span, sampling it at a predetermined sampling period and converting it to digital form;

(b) for each known modulating code, determining first sets of trial carrier frequency shifts and of code delays, locally generating code modulated signals defined by said known modulating code and said first sets of trial carrier frequency shifts and of trial code delays, and computing correlations of said digitized signal with said locally generated code-modulated signals;

characterized in that it further comprises the steps of:

(c) for each known modulating code and for each trial carrier frequency shift of said first set of trial carrier frequency shifts:

(c1) determining a primary correlation peak of greatest magnitude as a function of the trial code delay;

(c2) determining if said primary correlation peak is representative of an individual signal generated by one of the plurality of emitters using said modulating code, by comparing its magnitude to a threshold; and (c3) if said main correlation peak is determined to be representative of an individual signal, determining if it is affected by interferences from individual signals generated by another of the plurality of emitters by comparing its magnitude to that of a secondary correlation peak of smaller magnitude corresponding to a different code delay for a same trial carrier frequency shift;

(d) for each known modulating code selecting, among the primary correlation peaks which have been determined to be representative of an individual signal and not to be affected by interferences from individual signals generated by another of the plurality of emitters, if any, the one having the greatest magnitude, and taking the corresponding trial carrier frequency shift and code delay as estimates of the unknown carrier frequency shift and code delay of said individual signal.

2. The method according to claim 1, further comprising a step of:

(e) determining that one of the plurality of emitters is affected by interferences from individual signals generated by others of the plurality of emitters if, for the modulating code corresponding to said emitter, all the correlation peaks which have been determined to be representative of an individual signal have also been determined to be affected by interferences; otherwise determining that said emitter is free from interferences.

3. The method according to claim 1 wherein, for each known modulating code, the step of:

determining if each correlation peak is affected by interferences from individual signals generated by others of the plurality of emitters, is only performed after the steps of:

(1) determining a correlation peak as a function of the trial code delay, and (2) determining if said correlation peak is representative of an individual signal generated by an emitter using said modulating code, have been performed for all the trial carrier frequency shifts of said first set of trial carrier frequency shifts.

4. The method according to claim 1, wherein said step of computing correlations comprises:

(b1) subdividing the received, down-concerted, sampled and digitized set of code-modulated positioning signals into a plurality of data blocks;

(b2) computing correlations of said data blocks with said locally generated code-modulated signals including the Doppler effect on the code; and (b3) incoherently summing the results of said correlations.

5. The method according to claim 1, wherein the difference between two trial code delays of said first set is equal to the sampling period of said received signal.

6. The A method according to claim 1, wherein said modulating codes are periodic codes having a same code period and said first set of trial code delays spans a time interval equal to said code period.

7. The method according to claim 4, wherein the difference between two trial carrier frequency shifts of said first set is lesser or equal to the reciprocal of the duration of said data blocks whose correlation is computed.

8. The method according to claim 1, wherein said step of computing correlations comprises: multiplying the Fourier transform of said digitized signal by the complex conjugate Fourier transform of said locally generated code-modulated signals for each trial carrier frequency shift, and computing the inverse Fourier transform of the resulting product.

9. The method according to claim 1, wherein said step of determining if said primary correlation peak is affected by interferences from individual signals generated by others of the plurality of emitters comprises:

(c3.1) identifying a secondary correlation peak for the same carrier frequency shift;

(c3.2) computing the difference of the values of the primary correlation peak and of the secondary correlation peak and normalizing it with respect to a background noise amplitude estimation; and (c3.3) determining that said primary correlation peak is affected by interferences from individual signals generated by others of the plurality of emitters if said normalized difference is smaller than a predetermined threshold value.

10. The method according to claim 9, wherein said background noise amplitude estimation is computed by computing a standard deviation estimation of the distribution of the correlation values for the considered trial carrier frequency shift and for all trial code delay, excluding by the standard deviation estimation calculation said primary correlation peak as well as correlation values for trial delays adjacent to said peak.

11. The method according to claim 1, further comprising a refining step of:

(f1) selecting the modulating codes for which at least a primary correlation peak has been determined to be representative of an individual signal and not to be affected by interferences;

(f2) for each selected modulating code:

(f2.1) determining a second set of trial carrier frequency shifts including the previously determined estimate of the unknown carrier frequency shift, the difference between two trial carrier frequency shifts of said second set being lesser than the difference between two trial carrier frequency shifts of said first set; and (f2.3) determining a second set of trial code delays including the previously determined estimate of the unknown code delay, the difference between two trial code delays of said second set being lesser than or equal to the difference between two trial code delays of said first set;

(f3) locally generating code-modulated signals defined by said modulating code, said different trial carrier frequency shifts and said trial code delays, and computing correlations of said digitized signal with said locally generated code-modulated signals;

(f4) determining improved frequency shift and code delay estimates on the basis of the newly-computed correlations.

12. The method according to claim 11, wherein said newly-computed correlations are linear correlations.

13. The method according to claim 11, wherein said second set of trial carrier frequency shifts spans a frequency interval centered on said previously determined estimate of the unknown carrier frequency shift and having a width of twice the difference between two trial carrier frequency shifts of said first set.

14. The method according to claim 11, wherein said difference between two trial carrier frequency shifts of said second set is proportional to the inverse of the total correlation time.

15. The method according to claim 11, wherein said second set of trial code delays spans a time interval centered on said previously determined estimate of the unknown trial code delays and having a width of twice the difference between two trial code delays of said first set.

16. The method according to claim 11, wherein the step of determining improved frequency shift and code delay estimates on the basis of the newly-computed correlations comprises:

(f4.1) performing a piecewise polynomial interpolation of said correlations;

(f4.2) for each selected code and for each trial carrier frequency shift, determining an interpolating function peak as a function of the trial code delay;

(f4.3) for each selected code, choosing the interpolating function peak having the greatest magnitude, and taking the corresponding trial carrier frequency shift and code delay as said improved frequency shift and code delay estimates.

17. The method according to claim 16, wherein said piecewise polynomial interpolation is chosen between a piecewise linear interpolation and a quadratic interpolation.

18. The method according to claim 2, further comprising the steps of:

(g) for each modulating code for which at least a correlation peak has been determined to be possibly representative of an individual signal generated by the emitter using said modulating code, estimating a carrier-to-noise spectral density ratio for the corresponding individual signal; and (h) if said carrier-to-noise spectral density ratio is greater than a predetermined threshold, determining that said individual signal is likely to produce interferences.

19. The method according to claim 18, further comprising the steps of:

(i) canceling interferences from the received, sampled and digitized signal by using a subspace projection method; and (j) repeating the steps following conversion to digital form for individual signal which have undergone interference cancellation.

20. The method according to claim 2, further comprising the step of determining if the number of frequency shift and code delay estimates is sufficient for positioning and, if the number of said estimates is determined to be insufficient, further comprising the steps of:

(g) for each modulating code for which at least a primary correlation peak has been determined to be representative of an individual signal generated by the emitter using said modulating code, estimating a carrier-to-noise spectral density ratio for the corresponding individual signal;

(h) if said carrier-to-noise spectral density ratio is greater than a predetermined threshold, determining that said individual signal is suitable to produce interferences;

(i) canceling interferences from the received, down-concerted, sampled and digitized set of code-modulated positioning signals by using a subspace projection method; and (j) repeating the steps following conversion to digital form for individual signals which have undergone interference cancellation.

21. The method according to claim 19, wherein said step (8) of canceling interferences comprises:

(i1) building a set of orthonormal vectors equivalent to the set of individual signals which have been determined to be likely to produce interferences;

(i2) taking, as interference-cancelled signals, the orthogonal complements of said individual signals, which have been determined to be affected by interferences from individual signals generated by other emitters, with respect to the subspace generated by said set of orthonormal vectors.

22. The method according to claim 21, wherein said step of building a set of orthonormal vectors is performed by Gram-Schmidt orthogonalization.

23. The method according to claim 19, wherein said steps of estimating a carrier-to-noise spectral density ratio, of determining if an individual signal is suitable to produce interferences and of canceling interferences from the received, down-concerted, sampled and digitized set of code-modulated positioning signals are performed for each known modulating code after said step of determining if correlation peaks are affected by interferences and before taking into account the next known modulating code.

24. The method according to claim 1, wherein said emitters are satellite emitters.

25. The method according to claim 24, comprising a step of acquiring from a terrestrial assistance emitter a set of modulating codes corresponding to satellite emitters from which individual signals are received.

26. A method of processing a set of spread-spectrum positioning signals constituted by a superposition of individual signals generated by a plurality of emitters, the individual signal generated by each emitter being defined by a known modulating code, by an unknown code delay and by an unknown carrier frequency shift, the method comprising the steps of:

acquiring from a terrestrial assistance emitter a set of modulating codes corresponding to satellite emitters from which individual signals are received;

performing a second method until a first emitter is determined to be free from interferences, the second method comprising the steps of:

(a) receiving and down-converting said set of code-modulated positioning signals over a predetermined time span, sampling it at a predetermined sampling period and converting it to digital form;

(b) for each known modulating code, determining first sets of trial carrier frequency shifts and of code delays, locally generating code modulated signals defined by said known modulating code and said first sets of trial carrier frequency shifts and of trial code delays, and computing correlations of said digitized signal with said locally generated code-modulated signals;

characterized in that it further comprises the steps of:

(c) for each known modulating code and for each trial carrier frequency shift of said first set of trial carrier frequency shifts:

(c1) determining a primary correlation peak of greatest magnitude as a function of the trial code delay (1);

(c2) determining if said primary correlation peak is representative of an individual signal generated by one of the plurality of emitters using said modulating code, by comparing its magnitude to a threshold; and (c3) if said main correlation peak is determined to be representative of an individual signal, determining if it is affected by interferences from individual signals generated by another of the plurality of emitters by comparing its magnitude to that of a secondary correlation peak of smaller magnitude corresponding to a different code delay for a same trial carrier frequency shift;

(d) for each known modulating code selecting, among the primary correlation peaks which have been determined to be representative of an individual signal and not to be affected by interferences from individual signals generated by another of the plurality of emitters, if any, the one having the greatest magnitude, and taking the corresponding trial carrier frequency shift and code delay as estimates of the unknown carrier frequency shift and code delay of said individual signal; and (e) determining that one of the plurality of emitters is affected by interferences from individual signals generated by others of the plurality of emitters if, for the modulating code corresponding to said emitter, all the correlation peaks which have been determined to be representative of an individual signal have also been determined to be affected by interferences; otherwise determining that said emitter is free from interferences;

obtaining from said terrestrial assistance emitter, whose position is known, a set of code delays relative to said terrestrial assistance emitter, corresponding to satellite emitters from which individual signals are received;

for each remaining modulating codes corresponding to said satellite emitters from which individual signals are received:

determining first sets of trial carrier frequency shifts and of code delays, said first set of trial code delays being a reduced set determined on the basis of said set of code delays relative to said known-position terrestrial assistance emitter and on the basis of the code delay of said first acquired emitter;

locally generating code modulated signals defined by said modulating code, said trial carrier frequency shifts and said trial code delays, and computing correlations of said received, sampled and digitized signal with said locally generated code-modulated signals;

computing linear correlations of the received, sampled and digitized signal with said locally generated code-modulated signals;

for each of said modulating codes and trial carrier frequency shifts:

determining a correlation peak as a function of the trial code delay;

determining if said correlation peak is representative of an individual signal generated by an emitter using said modulating code, by comparing its magnitude to a first threshold;

for each modulating code for which at least a correlation peak has been determined to be possibly representative of an individual signal generated by the emitter using said modulating code:

estimating a carrier-to-noise spectral density ratio for the corresponding individual signal;

if said carrier-to-noise spectral density ratio is greater than a second threshold, determining that said individual signal is not affected by interferences from individual signals generated by other emitters;

for each said modulating code selecting, among the correlation peaks which have been determined to be representative of an individual signal and not to be affected by interferences from individual signals generated by other emitters, if any, the one having the greatest magnitude, and taking the corresponding trial carrier frequency shift and code delay as estimates of the unknown carrier frequency shift and code delay of said individual signal.

27. The method according to claim 26, further comprising a step of updating said second threshold to a value equal to the highest estimated carrier-to-noise spectral density ratio (in dBHz) minus a predetermined value (in dB).

28. The method according to claim 26, further comprising a refining step of:

(f1) selecting the modulating codes for which at least a correlation peak has been determined to be possibly representative of an individual signal and not to be affected by interferences;

(f2) for each selected modulating code:

(f2.1) determining a second set of trial carrier frequency shifts including the previously determined estimate of the unknown carrier frequency shift, the difference between two trial carrier frequency shifts of said second set being lesser than the difference between two trial carrier frequency shifts of said first set; and (f2.3) determining a second set of trial code delays including the previously determined estimate of the unknown code delay, the difference between two trial code delays of said second set being lesser than or equal to the difference between two trial code delays of said first set;

(f3) locally generating code-modulated signals defined by said modulating code, said different trial carrier frequency shifts and said trial code delays, and computing correlations of said digitized signal with said locally generated code-modulated signals;

(f4) determining improved frequency shift and code delay estimates on the basis of the newly-computed correlations.

29. The method according to claim 26 wherein, for each modulating code, said reduced set of trial code delays spans a time interval centered on said reference code delay and whose width is given by $$2\Delta\tau_i = 2\frac{d_{MAX}[\cos(e_i) + \cos(e_1)]}{c},$$

where:

$d_{MAX}$ is an upper estimate of the distance to said terrestrial assistance emitter;

$e_i$ is the elevation angle for the satellite emitter using said modulating code with respect to said terrestrial assistance emitter;

$e_1$ is the elevation angle for said first satellite emitter determined to be free from interferences with respect to said terrestrial assistance emitter; and c is the speed of light.

* * * * *